US008960697B2

(12) United States Patent
Kato et al.

(10) Patent No.: US 8,960,697 B2
(45) Date of Patent: Feb. 24, 2015

(54) SUSPENSION DEVICE FOR VEHICLE

(71) Applicant: Aisin Seiki Kabushiki Kaisha, Kariya-shi (JP)

(72) Inventors: Akira Kato, Kariya (JP); Takamasa Kato, Kariya (JP); Yoshifumi Ohtani, Kariya (JP); Katsuhiko Takasu, Kariya (JP); Masaaki Oishi, Kariya (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 0 days.

(21) Appl. No.: 14/343,254

(22) PCT Filed: Oct. 25, 2012

(86) PCT No.: PCT/JP2012/077611
§ 371 (c)(1),
(2) Date: Mar. 6, 2014

(87) PCT Pub. No.: WO2013/069469
PCT Pub. Date: May 16, 2013

(65) Prior Publication Data
US 2014/0217692 A1   Aug. 7, 2014

(30) Foreign Application Priority Data

Nov. 9, 2011   (JP) ................................. 2011-245826
Nov. 9, 2011   (JP) ................................. 2011-245827

(51) Int. Cl.
*B60G 17/04*   (2006.01)
*B60G 15/12*   (2006.01)
(Continued)

(52) U.S. Cl.
CPC .............. *B60G 15/12* (2013.01); *B60G 13/08* (2013.01); *B60G 17/08* (2013.01); *B60G 21/073* (2013.01); *B60G 2202/154* (2013.01); *B60G 2202/24* (2013.01)
USPC ............ 280/124.16; 280/124.157; 280/5.506

(58) Field of Classification Search
CPC ............................... B60G 17/08; B60G 15/12
USPC ........... 280/124.16, 124.161, 124.157, 5.506, 280/5.508, 5.509
See application file for complete search history.

(56) References Cited

U.S. PATENT DOCUMENTS 5,149,131 A     9/1992  Sugasawa et al.
5,899,472 A *   5/1999  Burke et al. ........... 280/124.106
(Continued)

FOREIGN PATENT DOCUMENTS

JP          46-3056 A    10/1971
JP          62-78510 U    5/1987
(Continued)

OTHER PUBLICATIONS

Notification of Transmittal of Translation of the International Preliminary Report on Patentability Forms (PCT/IB/338 and PCT/IB/373) and the Written Opinion of the International Searching Authority (Form PCT/ISA 237) dated May 22, 2014, issued in corresponding International Application No. PCT/JP2012/077611. (6 pgs).

(Continued)

*Primary Examiner* — James English
(74) *Attorney, Agent, or Firm* — Buchanan Ingersoll & Rooney PC

(57) ABSTRACT

A vehicle suspension device includes a first fluid path through which a first upper port opening into a first hydraulic cylinder and a second lower port opening into a second hydraulic cylinder communicate with each other, a second fluid path through which a second upper port opening into the second hydraulic cylinder and a first lower port opening into the first hydraulic cylinder communicate with each other, a first hydraulic damping mechanism in the first fluid path, a second hydraulic damping mechanism in the second fluid path, a first accumulator connected to the first fluid path via a first branch fluid path having a first auxiliary hydraulic damping mechanism, a second accumulator connected to the second fluid path via a second branch fluid path having a second auxiliary hydraulic damping mechanism, and a bridge fluid path through which the first and second branch fluid paths are connected together.

15 Claims, 14 Drawing Sheets

(51) Int. Cl.
*B60G 13/08* (2006.01)
*B60G 17/08* (2006.01)
*B60G 21/073* (2006.01)

(56) References Cited

U.S. PATENT DOCUMENTS

| | | | |
|---|---|---|---|
| 6,196,555 B1 * | 3/2001 | Gaibler | 280/6.154 |
| 6,318,742 B2 * | 11/2001 | Franzini | 280/124.106 |
| 6,519,517 B1 * | 2/2003 | Heyring et al. | 701/37 |
| 6,761,371 B1 * | 7/2004 | Heyring et al. | 280/124.157 |
| 7,607,672 B2 * | 10/2009 | Suzuki et al. | 280/124.16 |
| 2009/0140501 A1 * | 6/2009 | Taylor et al. | 280/5.508 |
| 2009/0174158 A1 * | 7/2009 | Anderson et al. | 280/5.507 |
| 2010/0300821 A1 | 12/2010 | Mori et al. | |
| 2011/0193301 A1 | 8/2011 | Hammelmeier et al. | |
| 2013/0099456 A1 | 4/2013 | Oshita et al. | |
| 2014/0232082 A1 * | 8/2014 | Oshita et al. | 280/124.161 |

FOREIGN PATENT DOCUMENTS

| | | |
|---|---|---|
| JP | 63-20208 A | 1/1988 |
| JP | 4-19210 A | 1/1992 |
| JP | 5-193331 A | 8/1993 |
| JP | 5-213040 A | 8/1993 |
| JP | 6-183240 A | 7/1994 |
| JP | 2007-196832 A | 8/2007 |
| JP | 2008-94304 A | 4/2008 |
| JP | 2010-274847 A | 12/2010 |
| JP | 2011-37435 A | 2/2011 |
| WO | WO 2012/063610 A1 | 5/2012 |

OTHER PUBLICATIONS

International Search Report (PCT/ISA/210) mailed on Nov. 27, 2012, by the Japanese Patent Office as the International Searching Authority for International Application No. PCT/JP2012/077611.

Written Opinion (PCT/ISA/237) mailed on Nov. 27, 2012, by the Japanese Patent Office as the International Searching Authority for International Application No. PCT/JP2012/077611.

* cited by examiner

SUSPENSION DEVICE FOR VEHICLE

TECHNICAL FIELD

The present invention relates to a suspension device for a vehicle for generating a damping force depending on vertical movement (e.g., bounce and roll) of a vehicle body.

BACKGROUND ART

As an example of this type of suspension devices for vehicles, PTL 1 describes a suspension device that includes shock absorbers that are provided between a left wheel and the vehicle body and between a right wheel and the vehicle body, respectively. In addition to the shock absorbers, the suspension device includes a damping mechanism including: a left hydraulic cylinder that is provided between the left wheel and the vehicle body; a right hydraulic cylinder that is provided between the right wheel and the vehicle body; a first fluid path that connects an upper cylinder chamber of the left hydraulic cylinder and a lower cylinder chamber of the right hydraulic cylinder together in communication with each other; a second fluid path that connects an upper cylinder chamber of the right hydraulic cylinder and a lower cylinder chamber of the left hydraulic cylinder together in communication with each other; a third fluid path that connects the first fluid path and a reservoir tank together in communication with each other; a fourth fluid path that connects the second fluid path and the reservoir tank together in communication with each other; and variable throttles that are provided in the third and fourth fluid paths, respectively. The suspension device also includes a control mechanism that adjusts the damping coefficient by controlling the positions (opening degrees) of the variable throttles, depending on how much the wheels and the vehicle body are vertically moved relative to each other.

In this suspension device for a vehicle, the shock absorber and the hydraulic cylinder type damping mechanism are arranged side by side, and therefore, the structure around the wheel is disadvantageously complicated. Moreover, it is necessary to detect the relative vertical movement (an amount, speed, etc.) of the wheel and the vehicle body, and based on the result of the detection, control the damping mechanism. Therefore, it is likely to disadvantageously take a lot of time and effort to control the device.

Furthermore, PTL 2 describes a suspension device for a four-wheel drive vehicle that includes a right wheel-side hydraulic cylinder and a left wheel-side hydraulic cylinder, the inside of each cylinder being partitioned into an upper oil chamber and a lower oil chamber by a piston. Each cylinder is interposed between a wheel and the vehicle body with the cylinder main body being coupled to one of the wheel and the vehicle body and the piston being coupled to the other one of the wheel and the vehicle body. The upper oil chamber of the right wheel-side hydraulic cylinder and the lower oil chamber of the left wheel-side hydraulic cylinder are made to communicate with each other via a first communication path. The lower oil chamber of the right wheel-side hydraulic cylinder and the upper oil chamber of the left wheel-side hydraulic cylinder are made to communicate with each other via a second communication path. A throttle member for generating a damping force is disposed in each of the first and second communication paths. Also, a damper having a cylinder whose inside is partitioned into a high pressure gas chamber and an oil chamber by a free piston, the oil chamber being made to communicate with a connection port via a throttle, is connected to each of the first and second communication paths.

This suspension device is configured to achieve favorable damping characteristics by damping expansion and contraction of the hydraulic cylinders due to rolling, bouncing, or the like of the vehicle body with resistance that a hydraulic fluid undergoes when passing through the throttle members in the first and second communication paths and the throttles of the dampers. However, in this suspension device, if internal leakage of the hydraulic fluid in the upper or lower chamber of the left wheel-side or right wheel-side hydraulic cylinder occurs as a result of repeated operating cycles of these cylinders, the hydraulic balance between the left and right hydraulic cylinders is lost, and thus the vehicle may disadvantageously tilt to the left or right.

CITATION LIST

Patent Literature

PTL 1: JP H05-193331A (paragraphs [0011-0048], FIG. 2)
PTL 2: JP H05-213040A (paragraphs [0008-0046], FIG. 1)

SUMMARY OF INVENTION

Technical Problem

In view of the above-described circumstances, it is demanded that, in a suspension device for a vehicle, loss of the hydraulic balance associated with leakage or the like of a hydraulic fluid in an upper or lower chamber of a pair of cross-connected hydraulic cylinders for suspension be suppressed.

Solution to Problem

In order to solve the above-described problems, a suspension device for a vehicle according to the present invention includes a first hydraulic cylinder configured to be interposed between one of left and right wheels and a vehicle body and having an upper chamber and a lower chamber, a second hydraulic cylinder configured to be interposed between the other one of the left and right wheels and the vehicle body and having an upper chamber and a lower chamber, a first fluid path through which a first upper port that opens into the upper chamber of the first hydraulic cylinder and a second lower port that opens into the lower chamber of the second hydraulic cylinder are connected together in communication with each other, a second fluid path through which a second upper port that opens into the upper chamber of the second hydraulic cylinder and a first lower port that opens into the lower chamber of the first hydraulic cylinder are connected together in communication with each other, a first hydraulic damping mechanism provided in the first fluid path, a second hydraulic damping mechanism provided in the second fluid path, a first accumulator connected to the first fluid path via a first branch fluid path having a first auxiliary hydraulic damping mechanism, a second accumulator connected to the second fluid path via a second branch fluid path having a second auxiliary hydraulic damping mechanism, and a bridge fluid path connected to a portion of the first branch fluid path between the first accumulator and the first auxiliary hydraulic damping mechanism at one end and connected to a portion of the second branch fluid path between the second accumulator and the second auxiliary hydraulic damping mechanism at the other end.

If repeated operating cycles of the hydraulic cylinders cause internal leakage of the hydraulic fluid in the upper chamber or the lower chamber of the hydraulic cylinders, the amount of hydraulic fluid varies between the first fluid path and the second fluid path, resulting in lack of hydraulic balance. However, with the above configuration, the bridge fluid path functioning as a hydraulic balance mechanism that adjusts the hydraulic balance between the first and second fluid paths also adjusts the hydraulic balance between the first and second fluid paths. Therefore, even if internal leakage between the upper and lower chambers of the hydraulic cylinders occurs, the bridge fluid path (hydraulic balance mechanism) balances the amounts of hydraulic fluid, and thus an undesirable situation in which the vehicle may tilt to the left or right is suppressed. Furthermore, the hydraulic fluid flowing into the bridge fluid path and the first and second accumulators is subjected to the damping effect of the first auxiliary hydraulic damping mechanism and the second auxiliary hydraulic damping mechanism, and thus the hydraulic shock is reduced. Note that the simplest configuration example of the auxiliary hydraulic damping mechanisms may be an orifice.

Moreover, it is also preferable that a flow control mechanism is inserted in the bridge fluid path. With this configuration, the first branch fluid path and the second branch fluid path are made to communicate with each other through the bridge fluid path in which the flow control mechanism adjusts the flow rate. Thus, the hydraulic fluid flows between the first branch fluid path and the second branch fluid path, and the hydraulic balance between the first branch fluid path and the second branch fluid path and, ultimately, the hydraulic balance between the first fluid path and the second fluid path can be adjusted.

Furthermore, it is also preferable that a third accumulator is connected to the bridge fluid path via the flow control mechanism. When the third accumulator is connected to the bridge fluid path, hydraulic pressure changes in the bridge fluid path can be smoothly adjusted. The third accumulator can also function as a temperature compensator for this hydraulic system. Moreover, the third accumulator can also assist the first and second accumulators, which provide hydraulic cylinder suspension functions together with the hydraulic cylinders, in terms of the capacity. This makes it possible to reduce the capacities of the first and second accumulators. The above-described bridge fluid path, flow control mechanism, and third accumulator function as the hydraulic balance mechanism that adjusts the hydraulic balance between the first and second fluid paths.

Furthermore, it is preferable that the flow control mechanism includes a housing forming internal chambers that are in communication with the third accumulator, a first differential pressure operated check valve disposed between the bridge fluid path on the first branch fluid path side and the corresponding internal chamber, and a second differential pressure operated check valve connected to the bridge fluid path on the second branch fluid path side and the corresponding internal chamber. With this configuration, pressure changes in the flow control mechanism can be reduced. Accordingly, the pipe diameters of the fluid paths connected to the flow control mechanism can be reduced. Thus, this configuration is advantageous in terms of the piping structure.

It is also possible that the flow control mechanism is configured by orifices that are provided in the bridge fluid path on both sides of a portion where the third accumulator is connected to the bridge fluid path. With this configuration, the structure of the flow control mechanism can be simplified.

According to one of the preferred embodiments of the invention, the first auxiliary hydraulic damping mechanism is provided in a portion of the first branch fluid path that is closer to the first fluid path than is the portion to which the bridge fluid path is connected, and the second auxiliary hydraulic damping mechanism is provided in a portion of the second branch fluid path that is closer to the second fluid path than is the portion to which the bridge fluid path is connected. More specifically, the portion of the first branch fluid path between the accumulator and the auxiliary hydraulic damping mechanism and the portion of the second branch fluid path between the accumulator and the auxiliary hydraulic damping mechanism are made to communicate with each other through the bridge fluid path. With this configuration, even if hydraulic pressure fluctuations occur in the first fluid path or the second fluid path, due to the auxiliary hydraulic damping mechanisms serving as buffers, the operation of the third accumulator is stabilized, and thus the temperature compensation function of the third accumulator can be stabilized.

According to one of the preferred embodiments of the invention, the first hydraulic damping mechanism has a first upper-side hydraulic damping mechanism provided on the first upper port side in the first fluid path and a first lower-side hydraulic damping mechanism provided on the second lower port side in the first fluid path, the second hydraulic damping mechanism has a second upper-side hydraulic damping mechanism provided on the second upper port side in the second fluid path and a second lower-side hydraulic damping mechanism provided on the first lower port side in the second fluid path, the first branch fluid path is connected between the first upper-side hydraulic damping mechanism and the first lower-side hydraulic damping mechanism, and the second branch fluid path is connected between the second upper-side hydraulic damping mechanism and the second lower-side hydraulic damping mechanism. With this configuration, the hydraulic fluid flowing out of the ports of the cylinders is subjected to appropriate damping effects of the hydraulic damping mechanisms associated with the respective ports. Thus, the stability of the vehicle body can be improved.

In this case, if a configuration is adopted in which the lengths of the connecting fluid paths each connecting the upper-side hydraulic damping mechanism and the corresponding lower-side hydraulic damping mechanism together are reduced, even in the case where the flows of the hydraulic fluid respectively flowing from the left and right hydraulic cylinders collide with each other in the first or second fluid path during the roll etc., the pressure loss due to the collision can be suppressed because the flow velocities of those flows of the hydraulic fluid have been decreased by the upper-side hydraulic damping mechanism and the lower-side hydraulic damping mechanism.

According to one of the preferred embodiments of the invention, the first fluid path includes a first upper-side fluid path through which the first upper port and the first upper-side hydraulic damping mechanism are connected together, a first connecting fluid path through which the first upper-side hydraulic damping mechanism and the first lower-side hydraulic damping mechanism are connected together, and a first lower-side fluid path through which the first lower-side hydraulic damping mechanism and the first lower port are connected together, the fluid path lengths of the first upper-side fluid path and the first connecting fluid path being shorter than the fluid path length of the first lower-side fluid path, and the second fluid path includes a second upper-side fluid path through which the second upper port and the second upper-side hydraulic damping mechanism are connected together, a second connecting fluid path through which the second upper-side hydraulic damping mechanism and the second lower-side hydraulic damping mechanism are connected together, and a second lower-side fluid path through which the second lower-side hydraulic damping mechanism and the second lower port are connected together, the fluid path lengths of the second upper-side fluid path and the second connecting fluid path being shorter than the fluid path length of the second lower-side fluid path.

In this configuration, the fluid path through which the upper port that opens into the upper chamber of one of the hydraulic cylinders and the lower port that opens into the lower chamber of the other hydraulic cylinder are connected together is provided with the upper-side hydraulic damping mechanism into which the hydraulic fluid from the upper port flows and the lower-side hydraulic damping mechanism into which the hydraulic fluid from the lower port side flows. Furthermore, the fluid path length (length of the upper-side fluid path) between the upper port and the upper-side hydraulic damping mechanism and the fluid path length (length of the connecting fluid path) between the upper-side hydraulic damping mechanism and the lower-side hydraulic damping mechanism are shorter than the fluid path length (length of the lower-side fluid path) between the lower-side hydraulic damping mechanism and the lower port. Since the upper chamber does not contain a piston rod, the amount of hydraulic fluid flowing out of the upper port is larger than that of the lower port accordingly. However, the lengths of the upper-side fluid path into which the hydraulic fluid from the upper port flows and the connecting fluid path are made shorter than the length of the lower-side fluid path, whereby the total line resistance is minimized, and the pressure loss is reduced. Thus, the suspension device for a vehicle according to the invention is capable of sufficiently damping the shock and also keeps an excellent hydraulic balance between the left and right sides, without using a complicated configuration. Moreover, according to the invention, since the hydraulic damping mechanisms are of a type connectable to a port of a hydraulic cylinder, a disadvantage of an increase in the mounting length of the hydraulic cylinders due to the hydraulic damping mechanisms is eliminated, so that a desired suspension stroke can be easily ensured.

According to one of the preferred embodiments of the invention, the sum of the fluid path lengths of the first upper-side fluid path and the first connecting fluid path is set to be shorter than the fluid path length of the first lower-side fluid path, and the sum of the fluid path lengths of the second upper-side fluid path and the second connecting fluid path is set to be shorter than the fluid path length of the second lower-side fluid path. Under the above conditions regarding the fluid path lengths, the connecting fluid paths through which the upper-side hydraulic damping mechanism and the lower-side hydraulic damping mechanism are connected together are disposed at a distance from the respective upper chambers of the hydraulic cylinders, the distance being shorter than or equal to half the length of the first or second fluid path. Thus, the above-described effect based on the fluid path lengths, which is a feature of the invention, can be achieved more reliably.

Another preferred embodiment is also proposed in which, in addition to reducing the fluid path length (length of the connecting fluid path) between the upper-side hydraulic damping mechanism and the lower-side hydraulic damping mechanism as described above, connecting the first accumulator to the first connecting fluid path and the second accumulator to the second connecting fluid path is adopted. When a roll etc. occurs, the flows of the hydraulic fluid respectively flowing from the left and right hydraulic cylinders will collide with each other in the first or second fluid path. With the above configuration, the flow velocities of the flows of the hydraulic fluid have been decreased by the upper-side hydraulic damping mechanism and the lower-side hydraulic damping mechanism before those flows collide with each other, and thus the pressure loss due to the collision can be suppressed.

According to another preferred embodiment, the first upper-side hydraulic damping mechanism, the first lower-side hydraulic damping mechanism, and the first connecting fluid path are integrated into a first hydraulic damping unit, the first hydraulic damping unit being disposed in proximity to the first upper port with respect to the fluid path length of the first fluid path, and the second upper-side hydraulic damping mechanism, the second lower-side hydraulic damping mechanism, and the second connecting fluid path are integrated into a second hydraulic damping unit, the second hydraulic damping unit being disposed in proximity to the second upper port with respect to the fluid path length of the second fluid path. Unitizing the hydraulic damping mechanisms in this manner makes the structure thereof compact and relieves restrictions on the mounting space thereof. Moreover, the unitized first hydraulic damping unit is disposed in proximity to the upper port, and thus the lengths of the upper-side fluid path into which the hydraulic fluid from the upper port flows and the connecting fluid path can be easily reduced to a length shorter than the lower-side fluid path.

According to one of the preferred embodiments of the invention, the first hydraulic damping unit further incorporates an accumulator-side hydraulic damping mechanism provided in a first accumulator fluid path between the first accumulator and the first connecting fluid path, and the second hydraulic damping unit further incorporates another accumulator-side hydraulic damping mechanism provided in a second accumulator fluid path between the second accumulator and the second connecting fluid path. With this configuration, the hydraulic fluid flowing through the accumulator fluid path connected to the accumulator is subjected to a damping effect, and accordingly the pressure shock reaching the accumulator can be reduced. Thus, a simple accumulator can be used.

Preferably, each of the accumulator-side hydraulic damping mechanisms may be configured by an orifice. This preferred form of the accumulator-side hydraulic damping mechanisms contributes to the cost reduction of the accumulator-side hydraulic damping mechanisms. Since each accumulator is connected to the corresponding connecting fluid path via the accumulator fluid path in which a hydraulic damping device such as an orifice is inserted, a reliable damping effect can be achieved during operation of the hydraulic cylinders, and pressure fluctuations generated at this time can also be appropriately absorbed.

Furthermore, it is preferable that the first hydraulic damping unit is configured to incorporate the first accumulator, and the second hydraulic damping unit is configured to incorporate the second accumulator. This simplifies the configurations of the hydraulic devices constituting the suspension device, and advantages with respect to the installation space and the maintenance checkup can be obtained.

According to one of the preferred embodiments of the invention, the first upper-side hydraulic damping mechanism, the first lower-side hydraulic damping mechanism, the second upper-side hydraulic damping mechanism, and the second lower-side hydraulic damping mechanism are configured to each include an orifice, a pressure control check valve, and an uncontrolled check valve that are connected in parallel each other. A hydraulic damping mechanism can be simply realized by only an orifice (throttle), but the hydraulic damping mechanisms herein are made dependent on the flow direction and the pressure. More specifically, the uncontrolled check valve, which is an ordinary check valve, allows the hydraulic fluid flowing in a direction in which the hydraulic fluid is discharged from the hydraulic cylinder to flow freely. The pressure control check valve, whose opening state varies depending on the hydraulic pressure in a fluid path, opens at a predetermined pressure value or more to allow the flow of the hydraulic fluid and also changes the degree of opening. The orifice continuously exerts a damping effect in the fluid path. Desired damping characteristics can be produced in each flow direction by appropriately combining the uncontrolled check valve, the pressure control check valve, and the orifice.

DESCRIPTION OF EMBODIMENTS

1. First Basic Configuration and Variation, and Embodiment Thereof

Figure 1:
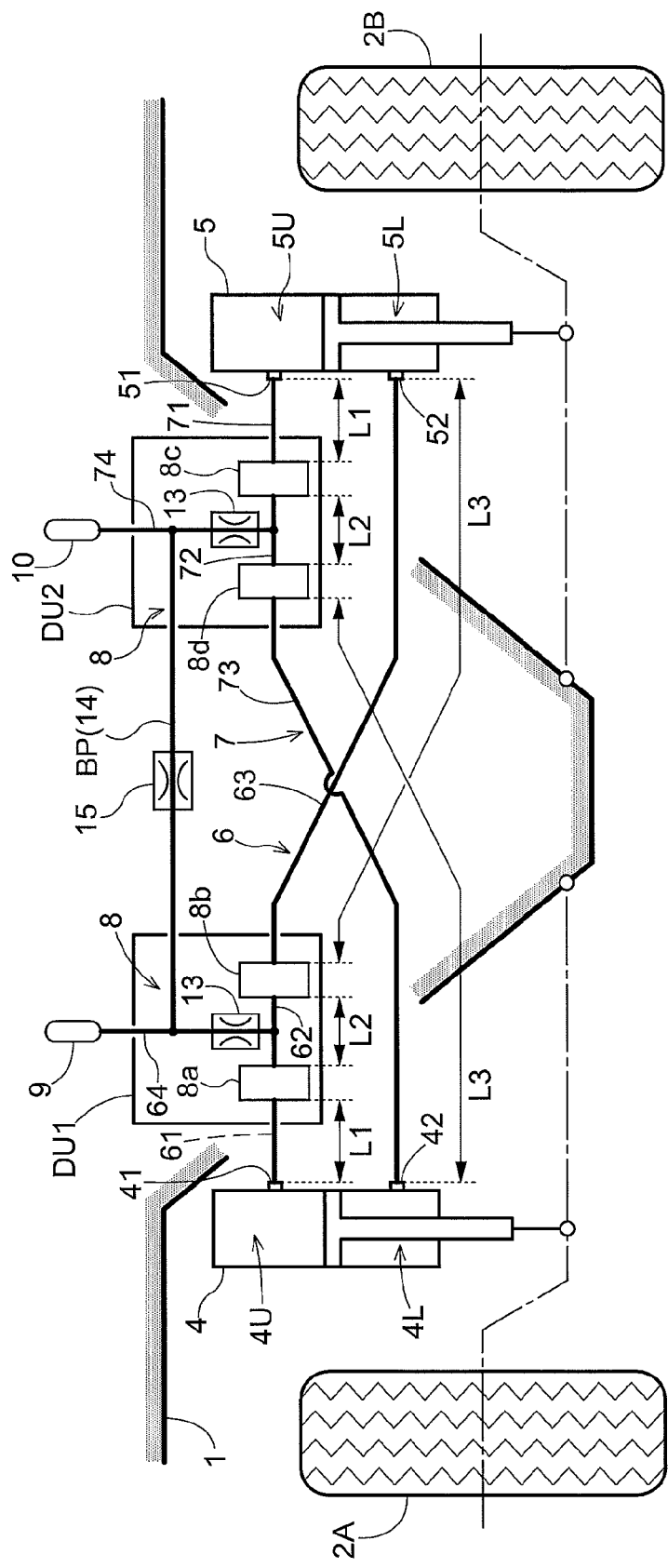
FIG. 1 is a schematic diagram showing an example of a first basic configuration of a suspension device according to the invention.

Before a first embodiment of a suspension device for a vehicle according to the invention and variations thereof will be described, a first basic configuration, which is a basic configuration of the first embodiment and its variations, and a variation of the first basic configuration will now be described using FIGS. 1 and 2.

Core components of this suspension device are a first hydraulic cylinder (hereinafter referred to as "left hydraulic cylinder" or simply as "hydraulic cylinder") 4 interposed between a left wheel 2A and a vehicle body 1, and a second hydraulic cylinder 5 (hereinafter referred to as "right hydraulic cylinder" or simply as "hydraulic cylinder") interposed between a right wheel 2B and the vehicle body 1. The left hydraulic cylinder 4 has an upper chamber 4U and a lower chamber 4L that are divided by a piston, whose piston rod penetrates the lower chamber 4L. A first upper port (sometimes simply referred to as "upper port") 41 that opens into the upper chamber 4U and a first lower port (sometimes simply referred to as "lower port") 42 that opens into the lower chamber 4L are provided in a circumferential wall of the left hydraulic cylinder 4. Similarly, the right hydraulic cylinder 5 has an upper chamber 5U and a lower chamber 5L that are divided by a piston, whose piston rod penetrates the lower chamber 5L. A second upper port (sometimes simply referred to as "upper port) 51 that opens into the upper chamber 5U and a second lower port (sometimes simply referred to as "lower port") 52 that opens into the lower chamber 5L are provided in a circumferential wall of the right hydraulic cylinder 5. In this example, the left wheel 2A and the right wheel 2B are coupled to the vehicle body 1 by a suspension link that is shown only schematically, and the piston rods of the hydraulic cylinders 4 and 5 are also coupled to the suspension link.

The upper port 41 of the left hydraulic cylinder 4 and the lower port 52 of the second hydraulic cylinder 5 are connected together in communication with each other through a first fluid path 6. The upper port 51 of the right hydraulic cylinder 5 and the lower port 42 of the first hydraulic cylinder 4 are connected together in communication with each other through a second fluid path 7. That is to say, the left hydraulic cylinder 4 and the right hydraulic cylinder 5 are cross-connected.

The first fluid path 6 and the second fluid path 7 are provided with a first hydraulic damping mechanism 8 and a second hydraulic damping mechanism 8, respectively. Here, the first hydraulic damping mechanism 8 is constituted by a first upper-side hydraulic damping mechanism 8a that is provided on the first upper port 41 side in the first fluid path 6 and a first lower-side hydraulic damping mechanism 8b provided on the second lower port 52 side in the first fluid path 6. Similarly, the second hydraulic damping mechanism 8 is constituted by a second upper-side hydraulic damping mechanism 8c provided on the second upper port 51 side in the second fluid path 7 and a second lower-side hydraulic damping mechanism 8d provided on the first lower port 42 side in the second fluid path 7. In this regard, both the first upper-side hydraulic damping mechanism 8a and the first lower-side hydraulic damping mechanism 8b that are inserted in the path of the first fluid path 6 are located significantly closer to the first upper port 41 side, that is, the side of the upper chamber 4U of the left hydraulic cylinder 4 than to the second lower port 52 side. Similarly, both the second upper-side hydraulic damping mechanism 8c and the second lower-side hydraulic damping mechanism 8d are located significantly closer to the second upper port 51 side, that is, the side of the upper chamber 5U of the right hydraulic cylinder 5 than to the first lower port 42 side. The first upper-side hydraulic damping mechanism 8a, the first lower-side hydraulic damping mechanism 8b, the second upper-side hydraulic damping mechanism 8c, and the second lower-side hydraulic damping mechanism 8d have substantially the same structure, and therefore may each be simply described as the hydraulic damping mechanism 8, which is a term that is used for all. In addition, the first hydraulic damping mechanism 8 and the second hydraulic damping mechanism 8 may each be simply described as the hydraulic damping mechanism 8 when it is not particularly necessary to distinguish between them. The hydraulic damping mechanism 8 basically has a narrowed, small diameter portion, for example, an orifice in its internal fluid path and produces a damping effect by decreasing the flow velocity of the hydraulic fluid between the cross-connected hydraulic cylinders.

The first fluid path 6 includes a first upper-side fluid path 61 that connects the first upper port 41 and the first upper-side hydraulic damping mechanism 8a to each other, a first connecting fluid path 62 that connects the first upper-side hydraulic damping mechanism 8a and the first lower-side hydraulic damping mechanism 8b to each other, and a first lower-side fluid path 63 that connects the first lower-side hydraulic damping mechanism 8b and the second lower port 52 to each other. Similarly, the second fluid path 7 includes a second upper-side fluid path 71 that connects the second upper port 51 and the second upper-side hydraulic damping mechanism 8c to each other, a second connecting fluid path 72 that connects the second upper-side hydraulic damping mechanism 8c and the second lower-side hydraulic damping mechanism 8d to each other, and a second lower-side fluid path 73 that connects the second lower-side hydraulic damping mechanism 8d and the first lower port 42 to each other.

A first branch fluid path branches off from the first connecting fluid path 62. A second branch fluid path branches off from the second connecting fluid path 72. The first branch fluid path is formed as a first accumulator fluid path 64 for connecting a first accumulator 9 that absorbs pressure fluctuations in the first fluid path 6 via an accumulator-side hydraulic damping mechanism 13, which is a first auxiliary hydraulic damping mechanism. The second branch fluid path is formed as a second accumulator fluid path 74 for connecting a second accumulator 10 that absorbs pressure fluctuations in the second fluid path 7 via another accumulator-side hydraulic damping mechanism 13, which is a second auxiliary hydraulic damping mechanism. Furthermore, a bridge fluid path BP is provided as a hydraulic balance mechanism 14 that adjusts the hydraulic balance between the first accumulator fluid path (first branch fluid path) 64 and the second accumulator fluid path (second branch fluid path) 74. One end of the bridge fluid path BP is connected to a portion of the first branch fluid path 64 between the first accumulator 9 and the accumulator-side hydraulic damping mechanism 13, and the other end is connected to a portion between the second accumulator 10 and the corresponding accumulator-side hydraulic damping mechanism 13. Furthermore, a flow control mechanism 15 is disposed in the bridge fluid path BP. Here, the bridge fluid path BP and the flow control mechanism 15 function as the hydraulic balance mechanism 14.

The hydraulic balance mechanism 14 has a function of redressing an imbalance in the amount of hydraulic fluid between the first fluid path 6 and the second fluid path 7 due to internal leakage of the two hydraulic cylinders 4 and 5 etc. that may occur when the suspension mechanism operates.

Note that with regard to the fluid path lengths of the first upper-side fluid path 61, the first connecting fluid path 62, and the first lower-side fluid path 63 constituting the first fluid path 6, and with regard to the fluid path lengths of the second upper-side fluid path 71, the second connecting fluid path 72, and the second lower-side fluid path 73 constituting the second fluid path 7, the following conditions should be met:

$L1 < L3$ and
$L2 < L3$ where the fluid path lengths of the upper-side fluid path 61, 71, the connecting fluid path 62, 72, and the lower-side fluid path 63, 73 are L1, L2, and L3, respectively.

Moreover, $(L1 + L2) < L3$ may also be used as a more strict condition.

Since the amount of hydraulic fluid flowing through the lower chamber in which the piston rod is present is smaller than the amount of hydraulic fluid flowing through the upper chamber, the flow resistance of the hydraulic fluid in the lower-side fluid path 63, 73 is smaller than that in the upper-side fluid path 61, 71 and the connecting fluid path 62, 72. Thus, it is possible to achieve a balance with respect to the flow resistances in the fluid paths between the cross-connected hydraulic cylinders by making the length of the lower-side fluid path 63, 73 longer than the lengths of the upper-side fluid path 61, 71 and the connecting fluid path 62, 72 based on the above-described conditions regarding the fluid path lengths.

In addition, it becomes easy to reduce the length of the first connecting fluid path 62 and integrate the first upper-side hydraulic damping mechanism 8a, the first lower-side hydraulic damping mechanism 8b, and the first connecting fluid path 62 into a first hydraulic damping unit DU1 by fulfilling the above-described conditions regarding the fluid path lengths, that is, $L1 < L3$ and $L2 < L3$. In this regard, the first hydraulic damping unit DU1 may be disposed in proximity to the first upper port 41 by reducing the length of the upper-side fluid path 61, or the length of the upper-side fluid path 61 may be reduced to substantially zero, that is, the first hydraulic damping unit DU1 may be directly connected to the first upper port 41. Similarly, it is possible to reduce the length of the second connecting fluid path 72 and integrate the second upper-side hydraulic damping mechanism 8c, the second lower-side hydraulic damping mechanism 8d, and the second connecting fluid path 72 into a second hydraulic damping unit DU2. Also, by reducing the length of the upper-side fluid path 71, it is possible to dispose the second hydraulic damping unit DU2 in proximity to the second upper port 51 or directly connect the second hydraulic damping unit DU2 to the second upper port 51.

Note that it is also possible to integrate the first upper-side hydraulic damping mechanism 8a, the first lower-side hydraulic damping mechanism 8b, the first connecting fluid path 62, and the first accumulator 9 into the first hydraulic damping unit DU1. Similarly, it is also possible to integrate the second upper-side hydraulic damping mechanism 8c, the second lower-side hydraulic damping mechanism 8d, the second connecting fluid path 72, and the second accumulator 10 into the second hydraulic damping unit DU2.

Figure 2:
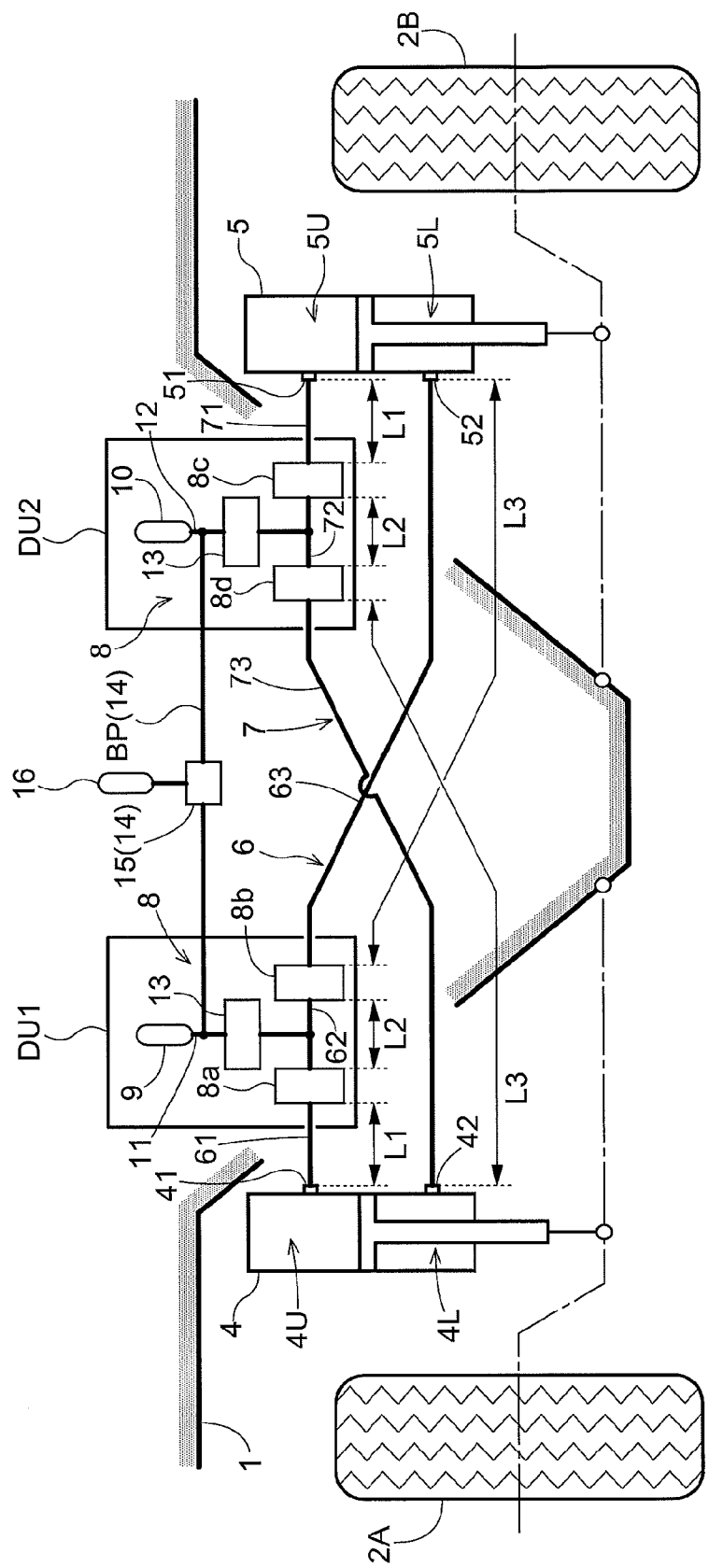
FIG. 2 is a schematic diagram showing a variation of the first basic configuration of the suspension device according to the invention.

FIG. 2 shows a variation of the first basic configuration of the suspension device according to the invention. This variation differs from the first basic configuration shown in FIG. 1 in that a third accumulator 16 is connected via the flow control mechanism 15. The flow control mechanism 15 has a flow control function for the first connecting fluid path 62 and a flow control function for the second connecting fluid path 72. Such a flow control function can be achieved by an orifice or the like. The hydraulic fluid whose flow rate is thus controlled acts on the third accumulator 16. The third accumulator 16 is capable of performing temperature compensation of the hydraulic system of this suspension device and also sharing the capacity with the first accumulator 9 and the second accumulator 10, thereby contributing to size reduction of the first accumulator 9 and the second accumulator 10.

In the variation of the first basic configuration in FIG. 2, the first upper-side hydraulic damping mechanism 8a, the first lower-side hydraulic damping mechanism 8b, the first connecting fluid path 62, the first accumulator fluid path 11, the accumulator-side hydraulic damping mechanism 13, and, if necessary, the first accumulator 9 can be unitized into the first hydraulic damping unit DU1. Similarly, the second upper-side hydraulic damping mechanism 8c, the second lower-side hydraulic damping mechanism 8d, the second connecting fluid path 72, the second accumulator fluid path 12, the accumulator-side hydraulic damping mechanism 13, and, if necessary, the second accumulator 10 can be unitized into the second hydraulic damping unit DU2. Furthermore, the bridge fluid path BP, the flow control mechanism 15, and the third accumulator 16 can be unitized into a hydraulic balance unit DU3. The unitization as described above makes the components of the suspension device compact, and the ease of mounting of those components can be improved.

In addition, since the flow control mechanism 15 is disposed between the first hydraulic damping unit DU1 and the second hydraulic damping unit DU2, pressure change due to disturbance is reduced. Thus, an inexpensive valve that opens/closes using a pressure difference or the like can be used as the flow control mechanism 15, and therefore the function of the flow control mechanism 15 is also stabilized. Moreover, a narrow hydraulic pipe can be used as the bridge fluid path BP, and therefore the ease of mounting of the hydraulic balance unit DU3 is also increased.

Figure 3:
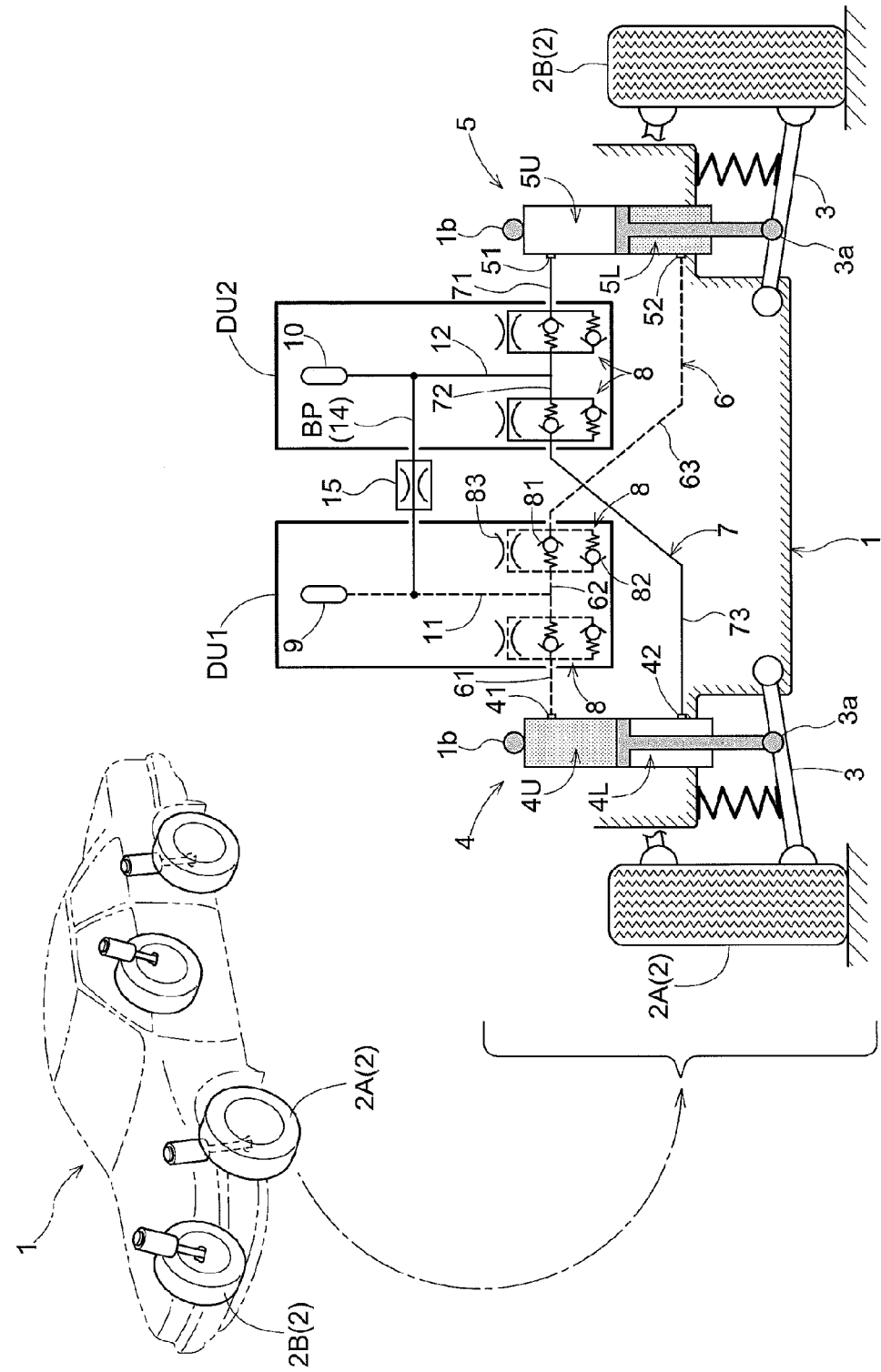
FIG. 3 is a front view schematically showing a first embodiment of the suspension device according to the invention.
Figure 4:
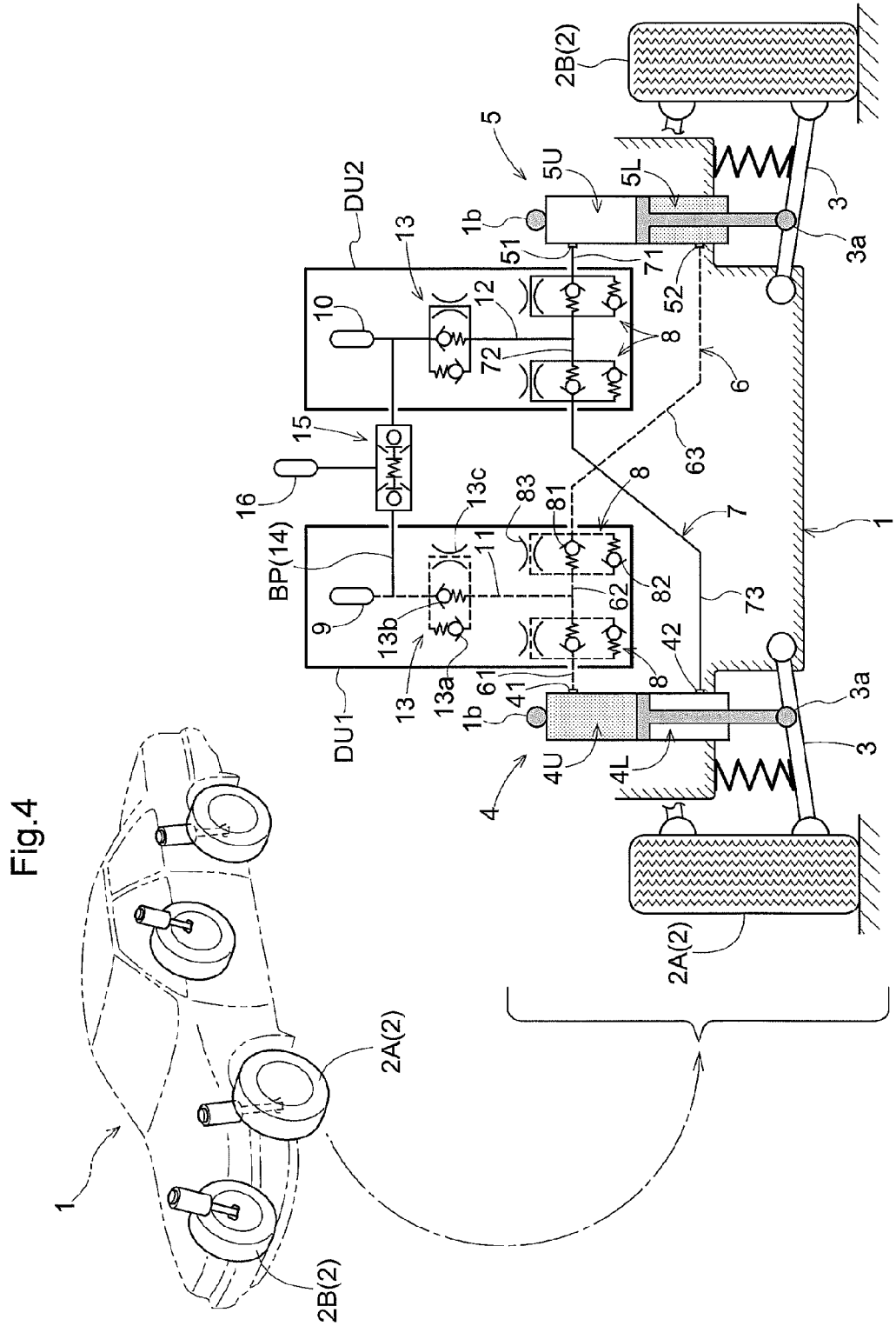
FIG. 4 is a front view schematically showing a variation of the first embodiment of the suspension device according to the invention shown in FIG. 3.

FIG. 3 shows the first embodiment, which is one of the specific embodiments of the suspension device for a vehicle according to the invention, and FIG. 4 shows a variation thereof. A suspension device for a vehicle shown in FIG. 3 is based on the first basic configuration that has been described above using FIG. 1, and more specifically, FIG. 3 is a front view schematically showing a portion thereof including a pair of front wheels (or rear wheels). FIG. 4 is a front view showing a suspension device for a vehicle based on the variation of the first basic configuration according to the invention that has been described above using FIG. 2. Since the suspension device shown in FIG. 3 is a simplified version of the suspension device shown in FIG. 4, the suspension device shown in FIG. 4 will be taken as an example in the following description of the embodiment.

In a vehicle to which this suspension device is mounted, the left wheel 2A and the right wheel 2B are attached to the vehicle body 1 in a manner that allows the wheels to rotate about their respective rotation axes. The left wheel 2A and the right wheel 2B will both be referred to as the wheels 2.

The wheels 2 are attached to the vehicle body 1 in a manner that allows the wheels 2 to move up and down by the left hydraulic cylinder 4 and the right hydraulic cylinder 5.

Specifically, the wheels 2 are attached to the vehicle body 1 by respective suspension links 3 that extend laterally from respective lower end portions of the vehicle body 1 and can swing up and down.

Also, upper end portions of the left and right hydraulic cylinders 4 and 5 are attached to respective support portions 1b of the vehicle body 1, and lower end portions thereof are attached to middle portions 3a of the respective suspension links 3. Thus, the left and right hydraulic cylinders 4 and 5 are configured to be expanded and contracted by relative vertical movements of the vehicle body 1 and the respective wheels 2 to achieve damping.

The suspension device includes the left and right hydraulic cylinders 4 and 5 that are attached between the left and right support portions 1b of the vehicle body 1 and the middle portions 3a of the left and right suspension links 3, the first fluid path 6 through which the upper chamber 4U of the left hydraulic cylinder 4 and the lower chamber 5L of the right hydraulic cylinder 5 are connected together in communication with each other, and the second fluid path 7 through which the upper chamber 5U of the right hydraulic cylinder 5 and the lower chamber 4L of the left hydraulic cylinder 4 are connected together in communication with each other. In the first and second fluid paths 6 and 7, the hydraulic damping mechanisms 8 that make a difference in the pressure or the flow speed of the hydraulic fluid and the first and second accumulators 9 and 10 are provided, where the hydraulic damping mechanisms 8 correspond to the first upper port 41, the first lower port 42, the second upper port 51, and the second lower port 52, which are the ports of the upper chamber 4U, the lower chamber 4L, the upper chamber 5U, and the lower chamber 5L, respectively.

Note that the first and second accumulators 9 and 10 are provided in order to impart roll stiffness to the vehicle. The containers of the first and second accumulators 9 and 10 are filled with a gas. The volume of the gas varies depending on the volume of the hydraulic fluid. As a result, the accumulators 9 and 10 each act as a gas spring. Specifically, when the hydraulic fluid flows into the first or second accumulator 9, 10, the gas is compressed, and the gas spring's force (restoring force) is exerted on the hydraulic fluid, whereby roll stiffness (stabilizer function) can be imparted to the vehicle.

The first fluid path 6 and the first accumulator 9 are connected together in communication with each other through the first accumulator fluid path 11. On the other hand, the second fluid path 7 and the second accumulator 10 are connected together in communication with each other through the second accumulator fluid path 12. The accumulator-side hydraulic damping mechanisms 13 that exert a load when the hydraulic fluid enters the first and second accumulators 9 and 10 are provided in the first accumulator fluid path 11 and the second accumulator fluid path 12, respectively. Furthermore, the hydraulic balance mechanism 14 that suppresses the vehicle's tilt etc. that is caused by a difference in the volume of the hydraulic fluid between the first and second fluid paths 6 and 7 due to an increase or decrease in the fluid volume is provided. In this embodiment, the hydraulic balance mechanism 14 has the bridge fluid path BP that connects a portion of the first accumulator fluid path 11 on the side of the first accumulator 9 and a portion of the second accumulator fluid path 12 on the side of the second accumulator 10 to each other to allow the hydraulic fluid to move between the first and second accumulator fluid paths 11 and 12, thereby keeping a balance of the volume of the hydraulic fluid. The flow control mechanism 15 that controls the movement of the hydraulic fluid between the first and second accumulator fluid paths 11 and 12 through the bridge fluid path BP using a pressure difference between the first and second accumulator fluid paths 11 and 12 is provided in the bridge fluid path BP. Here, the flow control mechanism 15 is formed as a three-port flow control valve, and the third accumulator 16 that functions an accumulator mainly for performing temperature compensation and assisting the first and second accumulators 9 and 10 is connected to one port of the flow control mechanism 15 communicating with internal chambers of the flow control mechanism 15.

The hydraulic cylinders 4 and 5 are each divided into an upper and a lower chamber by a piston. Piston rods are provided, penetrating through the lower chambers 4L and 5L, respectively.

Each hydraulic damping mechanism 8 includes an uncontrolled check valve 81 that allows the hydraulic fluid to only enter the corresponding upper or lower chamber, a control check valve 82 that allows the hydraulic fluid to be only discharged from the corresponding upper or lower chamber, and adjusts the flow rate of the hydraulic fluid based on the pressure difference, where the control check valve 82 is opened when the pressure difference is larger than or equal to a predetermined pressure value, and an orifice 83 that imparts a resistance to the flow of the hydraulic fluid.

Figure 6:
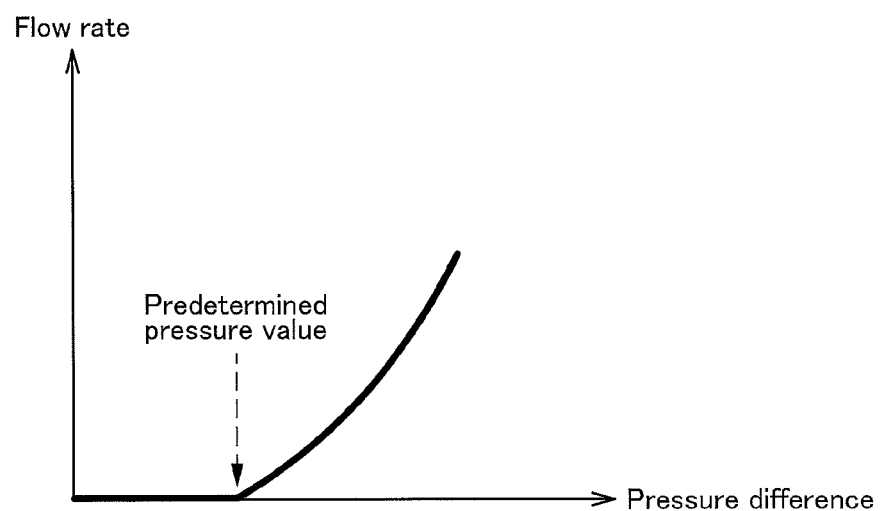
FIG. 6 is an explanatory diagram showing a relationship between pressures of a control check valve and flow rates.

A relationship between pressure differences of the control check valve 82 and flow rates is shown in FIG. 6.

The uncontrolled check valve 81 and the control check valve 82 each include a spring that exerts a closing force on the disc. The uncontrolled check valve 81 and the control check valve 82 may be configured so that as the closing force of the spring increases, the flow resistance of the hydraulic fluid also increases, and conversely, as the closing force decreases, the flow resistance of the hydraulic fluid decreases. The uncontrolled check valve 81 and the control check valve 82 may have a leaf valve structure. Note that the uncontrolled check valve 81 does not have a high flow resistance, in order to allow the hydraulic fluid to easily flow in.

The degree of opening of the control check valve 82 varies depending on the flow rate and the pressure difference, and the control check valve 82 generates a damping force corresponding to the opening degree. To achieve this, for example, the control check valve 82 is configured so that a flat spring etc. is used to exert an elastic force in a direction in which the flow path is closed.

Figure 5:
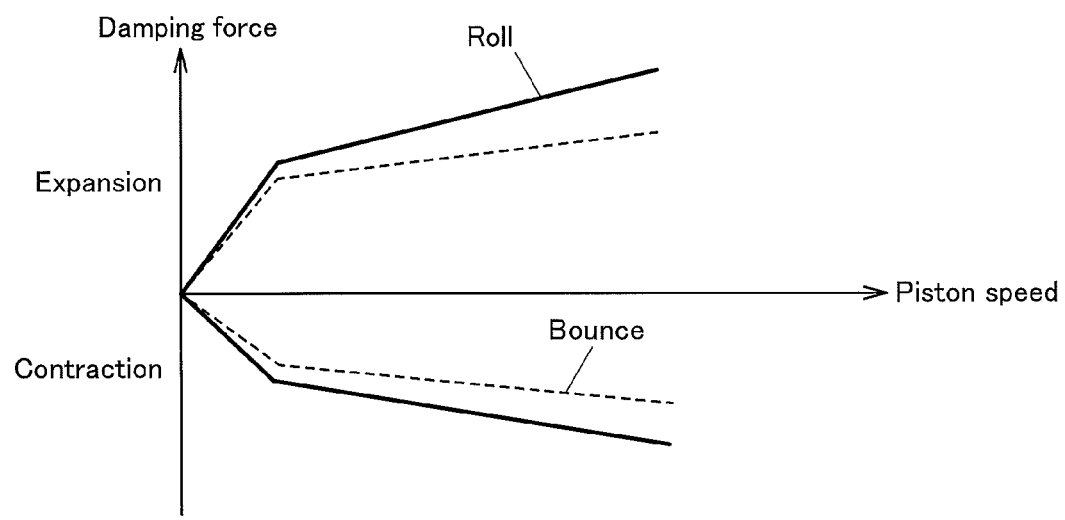
FIG. 5 is an explanatory diagram showing a relationship between piston speeds and damping forces.

Also, the control check valve 82 and the orifice 83 are configured to provide a relationship between piston speeds and flow resistances (corresponding to damping forces) that is shown in FIG. 5. As shown in FIG. 5, when the piston speed is low, increases in the flow resistance caused by the orifice 83 are dominating. When the piston speed is high, changes in the flow resistance caused by the control check valve 82 are dominating.

As can be seen from FIG. 5, desired damping suitable for the piston speed can be obtained.

As shown in FIG. 4, each accumulator-side hydraulic damping mechanism 13 includes a control check valve 13a that allows the hydraulic fluid to only enter the first or second accumulator 9, 10, and adjusts the flow rate based on the value of the pressure, where the control check valve 13a is opened when the pressure is higher than or equal to a predetermined pressure value, an uncontrolled check valve 13b that allows the hydraulic fluid to only be discharged from the first or second accumulator 9, 10, and an orifice 13c. The control check valve 13a and the uncontrolled check valve 13b each include a spring that exerts a closing force on the disc. The control check valve 13a and the uncontrolled check valve 13b may be configured so that as the closing force of the spring increases, the flow resistance of the hydraulic fluid also increases, and conversely, as the closing force decreases, the flow resistance of the hydraulic fluid decreases. The control check valve 13a and the uncontrolled check valve 13b may have a leaf valve structure. The uncontrolled check valve 13b has a low flow resistance so that the hydraulic fluid smoothly flows out of the first or second accumulator 9, 10, and the control check valve 13a is configured to generate a suitable damping force.

Also, as with the orifice 83, the orifice 13c can adjust the damping force when the piston speed is within a low region. Note that the orifice 13c is not necessarily needed, and may be removed, depending on the performance that the suspension device is required to have.

Figure 7:
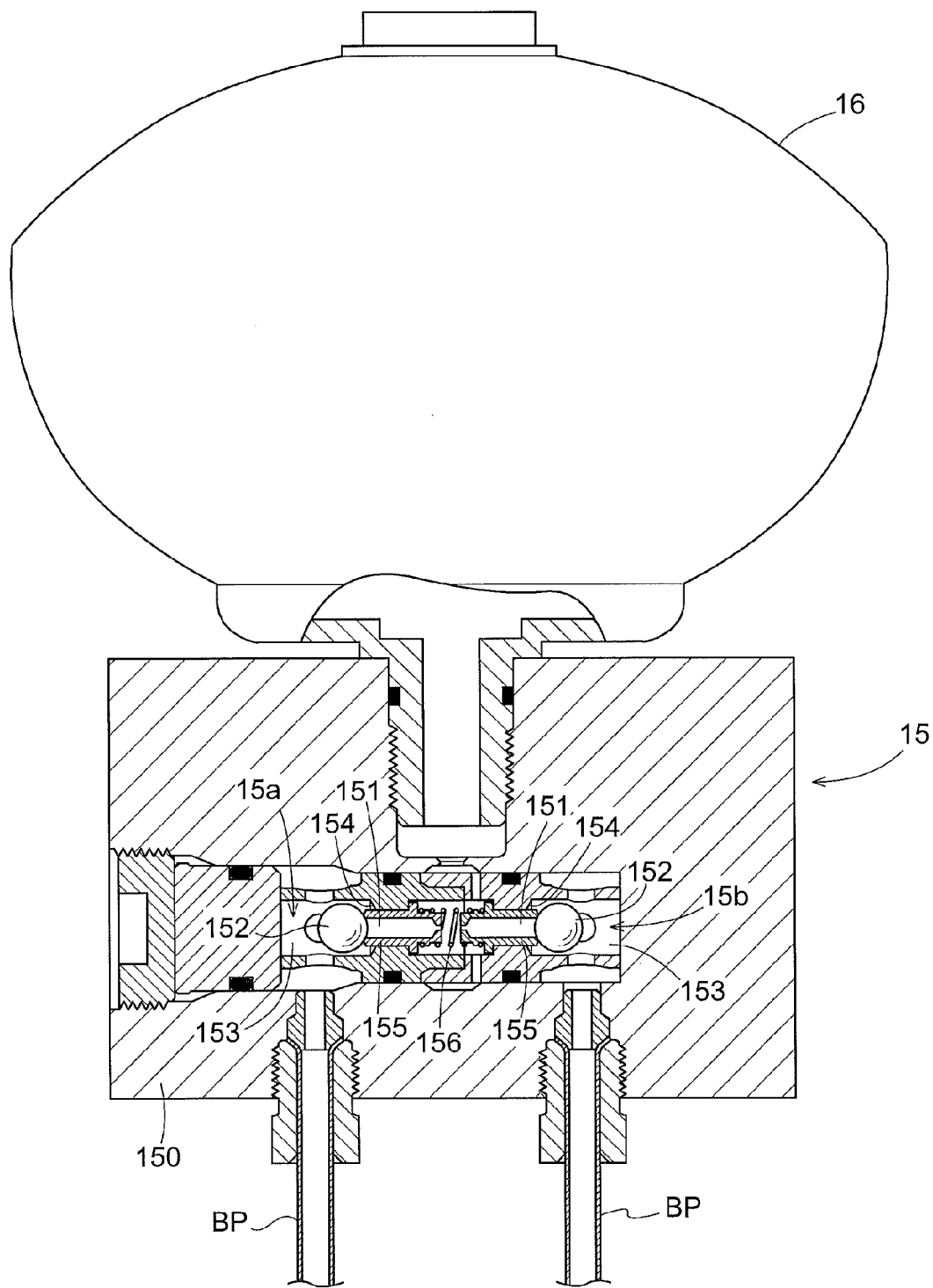
FIG. 7 is a schematic cross-sectional view showing a unitized hydraulic balance mechanism.

FIG. 7 shows an example of the flow control mechanism 15 that is formed as a three-port flow control valve. The flow control mechanism 15 includes a housing 150 that forms internal chambers 151 communicating with the third accumulator 16, a first differential pressure operated check valve 15a that is disposed between the bridge fluid path BP on the side of the first branch fluid path 11 (the side of the first fluid path 6) and the corresponding internal chamber 151, and a second differential pressure operated check valve 15b that is connected to the bridge fluid path BP on the side of the second branch fluid path 12 (the side of the second fluid path 7) and the corresponding internal chamber 151. The first differential pressure operated check valve 15a blocks flow of the hydraulic fluid when the pressure difference that is generated by the hydraulic fluid flowing from the side of the first branch fluid path 11 to the second branch fluid path 12 becomes larger than or equal to a predetermined value. The second differential pressure operated check valve 15b blocks flow of the hydraulic fluid when the pressure difference that is generated by the hydraulic fluid flowing from the side of the second branch fluid path 12 to the first branch fluid path 11 becomes larger than or equal to a predetermined value. Thus, sufficient driving stability can be easily ensured. For example, when the left and right wheels are balanced as in the case where the vehicle is driving straight ahead on a flat road surface or in the case where the vehicle is stopping, one side of the bridge fluid path BP and the other side of the bridge fluid path BP are in communication with each other, allowing the fluid to move freely therebetween, and thus the equilibrium of the amount of fluid between the two fluid paths is maintained. Moreover, when the vehicle turns or corners, resulting in rolling of the vehicle, the piston of one of the left and right hydraulic cylinders 4 and 5 moves, and the pressure difference generated by the flow of the hydraulic fluid from one side of the bridge fluid path BP to the other side becomes larger than or equal to a predetermined value. When this state continues for a predetermined period of time or longer, the movement of the fluid is blocked by the flow control mechanism 15. Thus, rolling can be reliably suppressed, and sufficient driving stability can be ensured.

The first differential pressure operated check valve 15a and the second differential pressure operated check valve 15b are formed to have the same structure, as schematically shown in FIG. 7. Specifically, in each valve, a ball 152 is accommodated in a valve chest 153 and is placed such that, when seated on a valve seat 154, the ball 152 interrupts the communication between the valve chest 153 and the corresponding internal chamber 151. Also, a sleeve 155 is disposed so as to come into contact with the ball 152. The sleeve 155 can be displaced between a position at which it unseats the ball 152 from the valve seat 154 and a position at which it allows the ball 152 to be seated on the valve seat 154. A groove is formed in an end face of the sleeve 155 that comes into contact with the ball 152. Thus, when the balls 152 are not seated on the respective valve seats 154, the valve chests 153 are in communication with each other via the internal chambers 151 even if the sleeves 155 are in contact with the respective balls 152. The sleeves 155 are biased by a spring 156 in a direction in which the balls 152 are unseated from the valve seats 154. Note that since the third accumulator 16 is connected to the flow control mechanism 15 in the above-described manner and connected to the hydraulic cylinders 4 and 5 via the accumulator-side hydraulic damping mechanisms 13, the third accumulator 16 is unlikely to be subjected to significant hydraulic pressure fluctuations caused by the stroke of the hydraulic cylinders 4 and 5, etc. Accordingly, the third accumulator 16 is not required to be as durable as the first and second accumulators 9 and 10, and thus a more inexpensive accumulator can be used.

Next, operations of the suspension device with respect to motions of the wheels 2 will be described.

Figure 8:
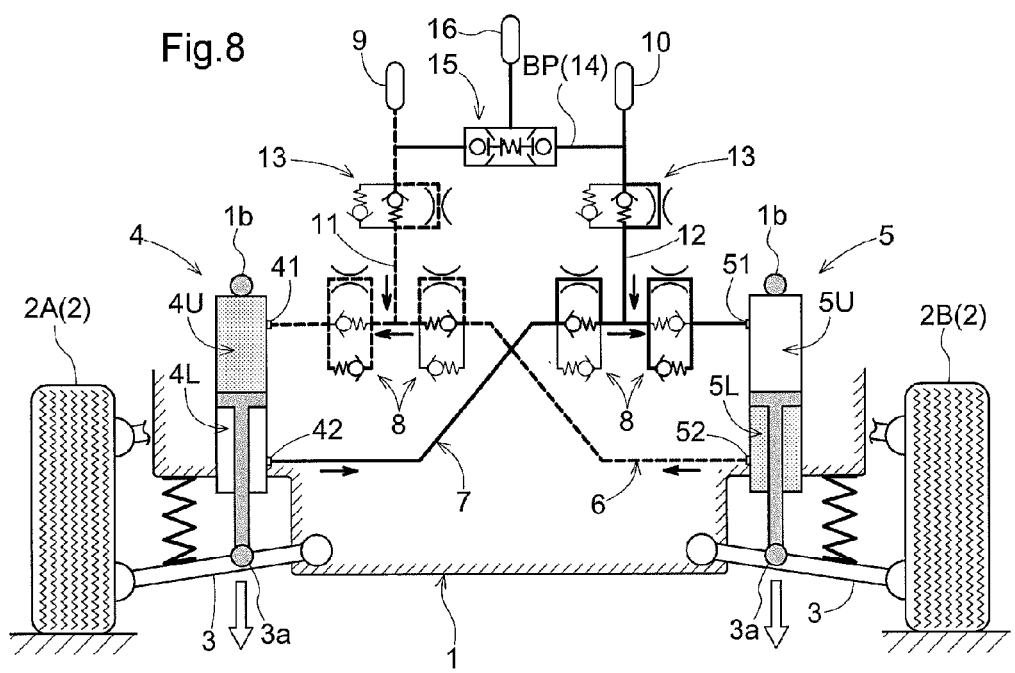
FIG. 8 is a schematic diagram showing an effect of the suspension device.
Figure 9:
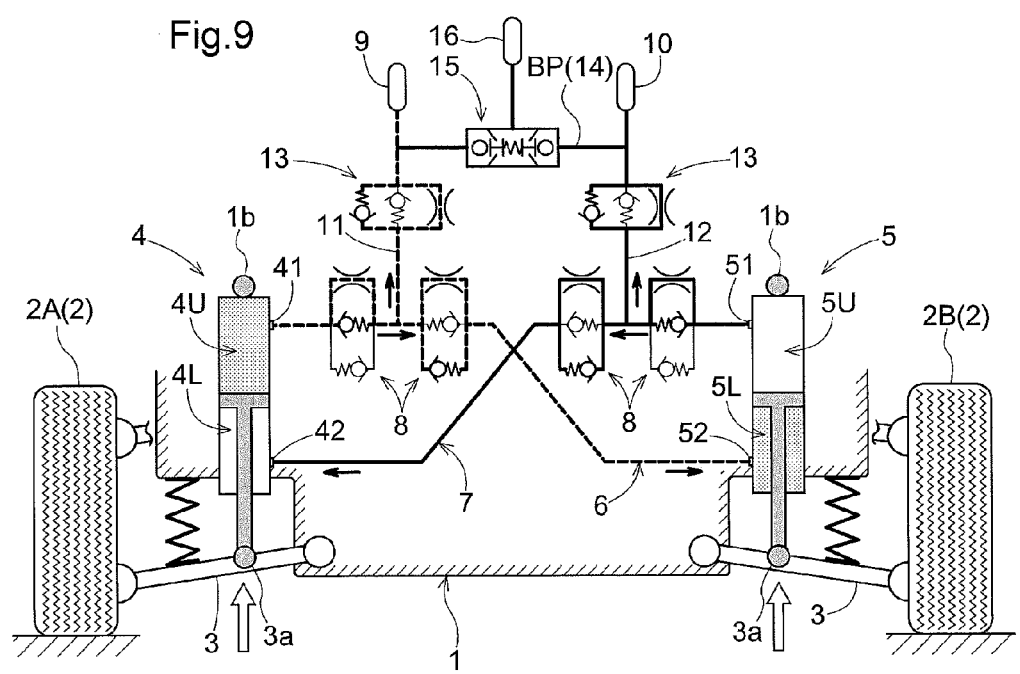
FIG. 9 is a schematic diagram showing an effect of the suspension device.
Figure 10:
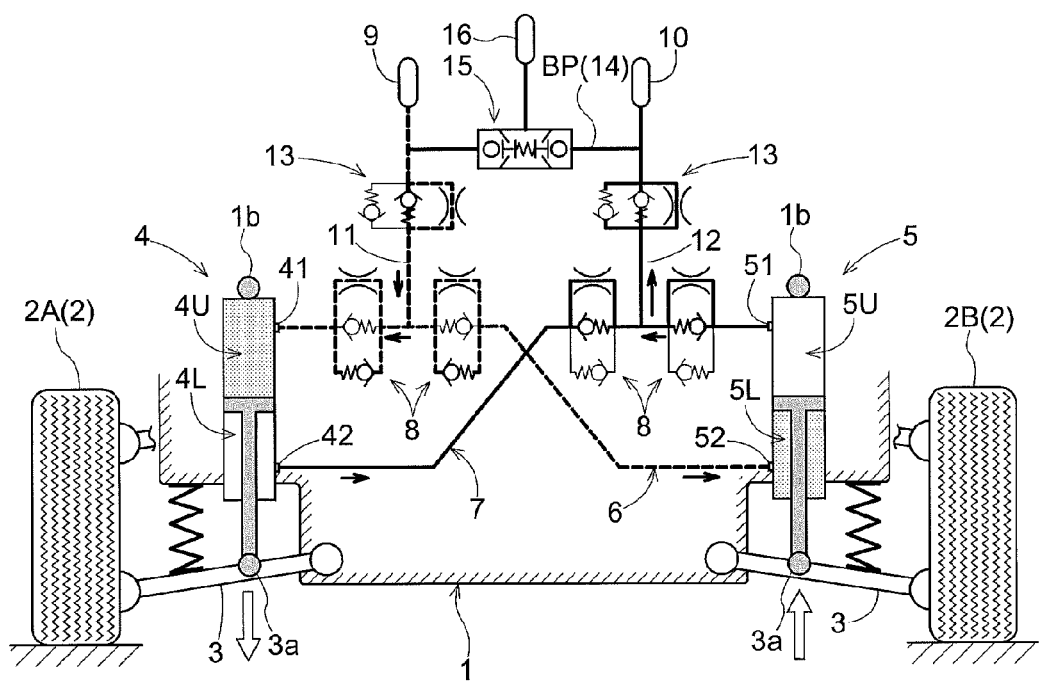
FIG. 10 is a schematic diagram showing an effect of the suspension device.

The following motions of the wheels 2 will be described: "expansion bounce", which is when the left and right hydraulic cylinders 4 and 5 expand together as shown in FIG. 8; "contraction bounce", which is when the left and right hydraulic cylinders 4 and 5 contract together as shown in FIG. 9; and "roll", which is when one of the left and right hydraulic cylinders 4 and 5 expands while the other one contracts as shown in FIG. 10.

The "expansion bounce" occurs when both of the wheels 2 rebound. As shown in FIG. 8, during the "expansion bounce," the hydraulic fluid is discharged from both of the lower chambers 4L and 5L, and flows through the corresponding hydraulic damping mechanisms 8 into the upper chambers 5U and 4U of the respective opposite cylinders. At this time, the absolute value of the amount of expansion or contraction is the same between the lower chamber 4L (5L) on one side and the upper chamber 5U (4U) on the other side, and therefore, the hydraulic fluid having an amount corresponding to the volume of the piston rod that is discharged from the lower chamber 4L (5L) smoothly flows from the accumulator 10 (9) through the uncontrolled check valve to the upper chamber 5U (4U). During the above flow of the hydraulic fluid, the hydraulic fluid is mainly discharged through the hydraulic damping mechanisms 8 corresponding to the lower chambers 4L and 5L, to generate damping forces.

Also, at this time, in the hydraulic damping mechanisms 8 corresponding to the upper chambers 4U and 5U, the uncontrolled check valve is set to have characteristics that allow the hydraulic fluid to smoothly flow into the upper chambers 4U and 5U in order to ensure a sufficient hydraulic pressure in the corresponding upper and lower chambers.

The "contraction bounce" occurs when both of the wheels 2 bound. As shown in FIG. 9, during the "contraction bounce," the hydraulic fluid is discharged from both of the upper chambers 4U and 5U, and flows through the corresponding hydraulic damping mechanisms 8 into the lower chambers 5L and 4L of the respective opposite cylinders. At this time, the absolute value of the amount of expansion or contraction is the same between the upper chamber 4U (5U) on one side and the lower chamber 5L (4L) on the other side, and therefore, the hydraulic fluid having an amount corresponding to the volume of the piston rod that enters the upper chamber 4U (5U) flows through the accumulator-side hydraulic damping mechanism 13 into the accumulator 9 (10). During the above flow of the hydraulic fluid, the hydraulic fluid is discharged through the hydraulic damping mechanisms 8 corresponding to the upper chambers 4U and 5U, to generate damping forces.

Note that, at this time, the flow rate of the hydraulic fluid having an amount corresponding to the volume of the rod that passes through the accumulator-side hydraulic damping mechanism 13 is low, and the damping force generated by the accumulator-side hydraulic damping mechanism 13 is small. Also, in the hydraulic damping mechanisms 8 corresponding to the lower chambers 4L and 5L, the uncontrolled check valve is set to have characteristics that allow the hydraulic fluid to smoothly enter the lower chambers 4L and 5L in order to ensure a sufficient hydraulic pressure in the corresponding upper and lower chambers.

The "roll" occurs when the vehicle turns or corners right or left. Here, a case where the vehicle turns or corners left will be described.

The left wheel 2A (an inner wheel during turning or cornering) relatively moves in the rebound direction, and as shown in FIG. 10, the hydraulic fluid is discharged from the lower chamber 4L, and flows through the corresponding hydraulic damping mechanism 8 and accumulator-side hydraulic damping mechanism 13 into the accumulator 10. The right wheel 2B (an outer wheel during turning or cornering) relatively moves in the bound direction, and as shown in FIG. 10, the hydraulic fluid is discharged from the upper chamber 5U, and flows through the corresponding hydraulic damping mechanism 8 and accumulator-side hydraulic damping mechanism 13 into the accumulator 10. At this time, a significant damping effect can be achieved by the hydraulic damping mechanism 8 corresponding to the lower chamber 4L of the left hydraulic cylinder 4, the hydraulic damping mechanism 8 corresponding to the upper chamber 5U of the right hydraulic cylinder 5, and the accumulator-side hydraulic damping mechanism 13 corresponding to the accumulator 10.

Also, the hydraulic fluid is supplied from the accumulator 9 to the upper chamber 4U of the left hydraulic cylinder 4 and the lower chamber 5L of the right hydraulic cylinder 5. In the hydraulic damping mechanisms 8 corresponding to the upper and lower chambers 4U and 5L, the uncontrolled check valves 81 for the upper and lower chambers 4U and 5L are set so that the hydraulic fluid smoothly enter the upper and lower chambers 4U and 5L in order to ensure sufficient fluid pressures of the corresponding lower and upper chambers 4L and 5U.

The characteristics of a shock damping force with respect to the above-described "expansion bounce," "contraction bounce," and "roll" may be shown in FIG. 5. Dashed lines indicate "expansion bounce" and "contraction bounce," and solid lines indicate "roll." The horizontal axis represents piston speeds, and the vertical axis represents damping forces. As the piston speed changes, the lines bend. In an initial area where the lines have a steep slope, the damping effect of the orifice 83 of the hydraulic damping mechanism 8 is mainly provided. In an area where the lines have a gentle slope, the damping effect of each of the hydraulic damping mechanisms 8 and the accumulator-side hydraulic damping mechanisms 13 is provided.

In the above-described suspension device, the shock with respect to "expansion bounce", "contraction bounce", and "roll" can be satisfactorily damped by the effect of the hydraulic damping mechanisms 8 and the accumulator-side hydraulic damping mechanisms 13 depending on the vertical motion of the wheels 2, to simultaneously ensure sufficient driving stability and good ride quality, without using a complicated mechanical mechanism or control mechanism.

Also, the suspension device of this embodiment can have both the absorber function and the stabilizer function, and therefore, a stabilizer bar can be removed, resulting in a simpler structure around the wheels 2.

Note that in the first hydraulic damping unit DU1, the fluid paths are formed so that when a roll occurs, the flows of the hydraulic fluid are changed in the following manner: the flow velocity of the hydraulic fluid flowing from the first upper port 41 into the first hydraulic damping unit DU1 is decreased by the first upper-side hydraulic damping mechanism 8a, while the flow velocity of the hydraulic fluid flowing from the second lower port 52 into the first hydraulic damping unit DU1 is decreased by the first lower-side hydraulic damping mechanism 8b, and furthermore, at this time, the two flows of the hydraulic fluid which have mutually opposite directional vectors and whose flow velocities have been decreased join together in the first connecting fluid path 62, whereby the pressure loss is minimized. Also, in the case where pressure fluctuations occur in the resultant joined flow of the hydraulic fluid, the pressure fluctuations are absorbed by the joined flow of the hydraulic fluid flowing through the first accumulator fluid path 11 into the first accumulator 9. Therefore, the first accumulator fluid path 11 and the first connecting fluid path 62 are also formed so that the flow of the hydraulic fluid into which the two flows have joined together in the first connecting fluid path 62 can smoothly flow into the first accumulator fluid path 11. It goes without saying that this fluid path configuration of the first hydraulic damping unit DU1 is also applied to the second hydraulic damping unit DU2.

The hydraulic damping mechanisms 8, the accumulator-side hydraulic damping mechanisms 13, and the flow control mechanism 15 are not limited to the specific configurations as described in the above embodiment. A configuration that electrically controls the valve opening state may also be incorporated in these mechanisms.

2. Second Basic Configuration and Variation, and Embodiment Thereof

Figure 11:
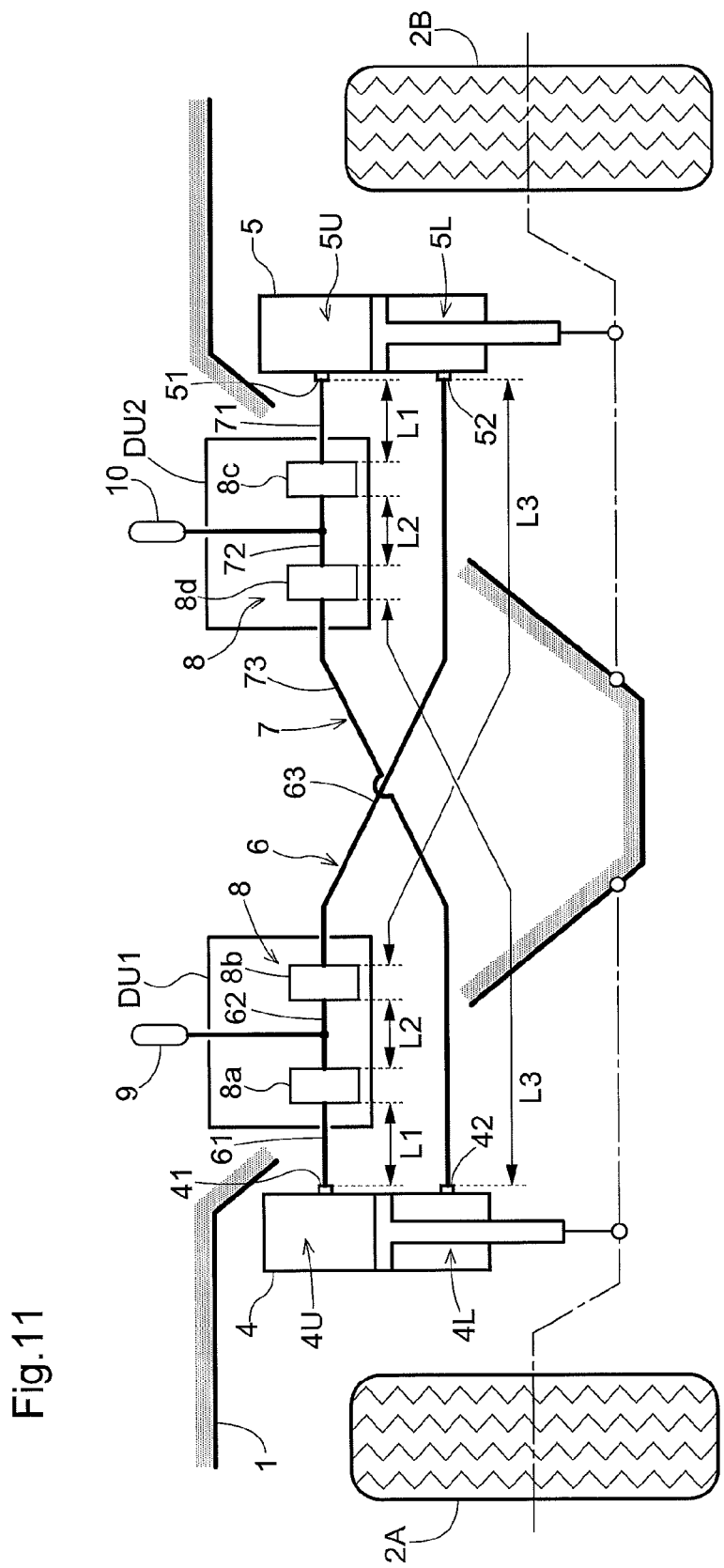
FIG. 11 is a schematic diagram showing an example of a second basic configuration of the suspension device according to the invention.

Before a second embodiment of the suspension device for a vehicle according to the invention and variations thereof will be described, a second basic configuration, which is a basic configuration of the second embodiment and its variations, and a variation of the second basic configuration will now be described using FIGS. 11 and 12.

Core components of this suspension device are a first hydraulic cylinder (hereinafter referred to as "left hydraulic cylinder" or simply as "hydraulic cylinder") 4 interposed between a left wheel 2A and a vehicle body 1, and a second hydraulic cylinder 5 (hereinafter referred to as "right hydraulic cylinder" or simply as "hydraulic cylinder") interposed between a right wheel 2B and the vehicle body 1. The left hydraulic cylinder 4 has an upper chamber 4U and a lower chamber 4L that are divided by a piston, whose piston rod penetrates the lower chamber 4L. A first upper port (sometimes simply referred to as "upper port") 41 that opens into the upper chamber 4U and a first lower port (sometimes simply referred to as "lower port") 42 that opens into the lower chamber 4L are provided in a circumferential wall of the left hydraulic cylinder 4. Similarly, the right hydraulic cylinder 5 has an upper chamber 5U and a lower chamber 5L that are divided by a piston, whose piston rod penetrates the lower chamber 5L. A second upper port (sometimes simply referred to as "upper port") 51 that opens into the upper chamber 5U and a second lower port (sometimes simply referred to as "lower port") 52 that opens into the lower chamber 5L are provided in a circumferential wall of the right hydraulic cylinder 5. In this example, the left wheel 2A and the right wheel 2B are coupled to the vehicle body 1 by a suspension link that is shown only schematically, and the piston rods of the hydraulic cylinders 4 and 5 are also coupled to the suspension link.

The upper port 41 of the left hydraulic cylinder 4 and the lower port 52 of the second hydraulic cylinder 5 are connected together in communication with each other through a first fluid path 6. The upper port 51 of the right hydraulic cylinder 5 and the lower port 42 of the first hydraulic cylinder 4 are connected together in communication with each other through a second fluid path 7. That is to say, the left hydraulic cylinder 4 and the right hydraulic cylinder 5 are cross-connected.

A first upper-side hydraulic damping mechanism 8a is provided on the first upper port 41 side in the first fluid path 6, and a first lower-side hydraulic damping mechanism 8b is provided on the second lower port 52 side in the first fluid path 6. A second upper-side hydraulic damping mechanism 8c is provided on the second upper port 51 side in the second fluid path 7, and a second lower-side hydraulic damping mechanism 8d is provided on the first lower port 42 side in the second fluid path 7. In this regard, the first upper-side hydraulic damping mechanism 8a and the first lower-side hydraulic damping mechanism 8b are located significantly closer to the first upper port 41 side, that is, the side of the upper chamber 4U of the left hydraulic cylinder 4 with respect to the course of the first fluid path 6. Similarly, the second upper-side hydraulic damping mechanism 8c and the second lower-side hydraulic damping mechanism 8d are located significantly closer to the second upper port 51 side, that is, the side of the upper chamber 5U of the right hydraulic cylinder 5. The first upper-side hydraulic damping mechanism 8a, the first lower-side hydraulic damping mechanism 8b, the second upper-side hydraulic damping mechanism 8c, and the second lower-side hydraulic damping mechanism 8d have substantially the same structure, and therefore may each be simply described as the hydraulic damping mechanism 8, which is a term that is used for all. The hydraulic damping mechanism 8 basically has a narrowed, small diameter portion, for example, an orifice in its internal fluid path and produces a damping effect by decreasing the flow velocity of the hydraulic fluid between the cross-connected hydraulic cylinders.

The first fluid path 6 includes a first upper-side fluid path 61 that connects the first upper port 41 and the first upper-side hydraulic damping mechanism 8a to each other, a first connecting fluid path 62 that connects the first upper-side hydraulic damping mechanism 8a and the first lower-side hydraulic damping mechanism 8b to each other, and a first lower-side fluid path 63 that connects the first lower-side hydraulic damping mechanism 8b and the second lower port 52 to each other. Similarly, the second fluid path 7 includes a second upper-side fluid path 71 that connects the second upper port 51 and the second upper-side hydraulic damping mechanism 8c to each other, a second connecting fluid path 72 that connects the second upper-side hydraulic damping mechanism 8c and the second lower-side hydraulic damping mechanism 8d to each other, and a second lower-side fluid path 73 that connects the second lower-side hydraulic damping mechanism 8d and the first lower port 42 to each other.

A first accumulator 9 is connected to the first connecting fluid path 62 of the first fluid path 6, and a second accumulator 10 is connected to the second connecting fluid path 72 of the second fluid path 7. The first and second accumulators 9 and 10 absorb pressure fluctuations in the respective fluid paths.

With regard to the fluid path lengths of the first upper-side fluid path 61, the first connecting fluid path 62, and the first lower-side fluid path 63 constituting the first fluid path 6, and with regard to the fluid path lengths of the second upper-side fluid path 71, the second connecting fluid path 72, and the second lower-side fluid path 73 constituting the second fluid path 7, the following conditions should be met:

$L1 < L3$ and
$L2 < L3$ where the fluid path lengths of the upper-side fluid path 61, 71, the connecting fluid path 62, 72, and the lower-side fluid path 63, 73 are L1, L2, and L3, respectively.

Moreover, $(L1+L2) < L3$ may also be used as a more strict condition.

Since the amount of hydraulic fluid flowing through the upper chamber, in which no piston rod is present, is larger than the amount of hydraulic fluid flowing through the lower chamber, in which the piston rod is present, the flow resistances of the hydraulic fluid in the upper-side fluid path 61, 71 and the connecting fluid path 62, 72 are greater than that in the lower-side fluid path 63, 73. Thus, it is possible to achieve a balance with respect to the flow resistances in the fluid paths between the cross-connected hydraulic cylinders by making the lengths of the upper-side fluid path 61, 71 and the connecting fluid path 62, 72 shorter than the length of the lower-side fluid path 63, 73 based on the above-described conditions regarding the fluid path lengths. In particular, in order to reduce the flow resistance in the connecting fluid path 62, 72 when the hydraulic fluid from the two hydraulic cylinders flows into that connecting fluid path, it is effective to reduce the length of the connecting fluid path 62, 72.

In addition, it becomes easy to reduce the length of the first connecting fluid path 62 and integrate the first upper-side hydraulic damping mechanism 8a, the first lower-side hydraulic damping mechanism 8b, the first connecting fluid path 62, and, if necessary, the first accumulator 9 into a first hydraulic damping unit DU1 by fulfilling the above-described conditions regarding the fluid path lengths, that is, L1<L3 and L2<L3. In this regard, the first hydraulic damping unit DU1 may be disposed in proximity to the first upper port 41 by reducing the length of the upper-side fluid path 61, or the length of the upper-side fluid path 61 may be reduced to substantially zero, that is, the first hydraulic damping unit DU1 may be directly connected to the first upper port 41. Similarly, it is possible to reduce the length of the second connecting fluid path 72 and integrate the second upper-side hydraulic damping mechanism 8c, the second lower-side hydraulic damping mechanism 8d, the second connecting fluid path 72, and, if necessary, the second accumulator 10 into a second hydraulic damping unit DU2. Also, by reducing the length of the upper-side fluid path 71, it is possible to dispose the second hydraulic damping unit DU2 in proximity to the second upper port 51 or directly connect the second hydraulic damping unit DU2 to the second upper port 51.

Figure 12:
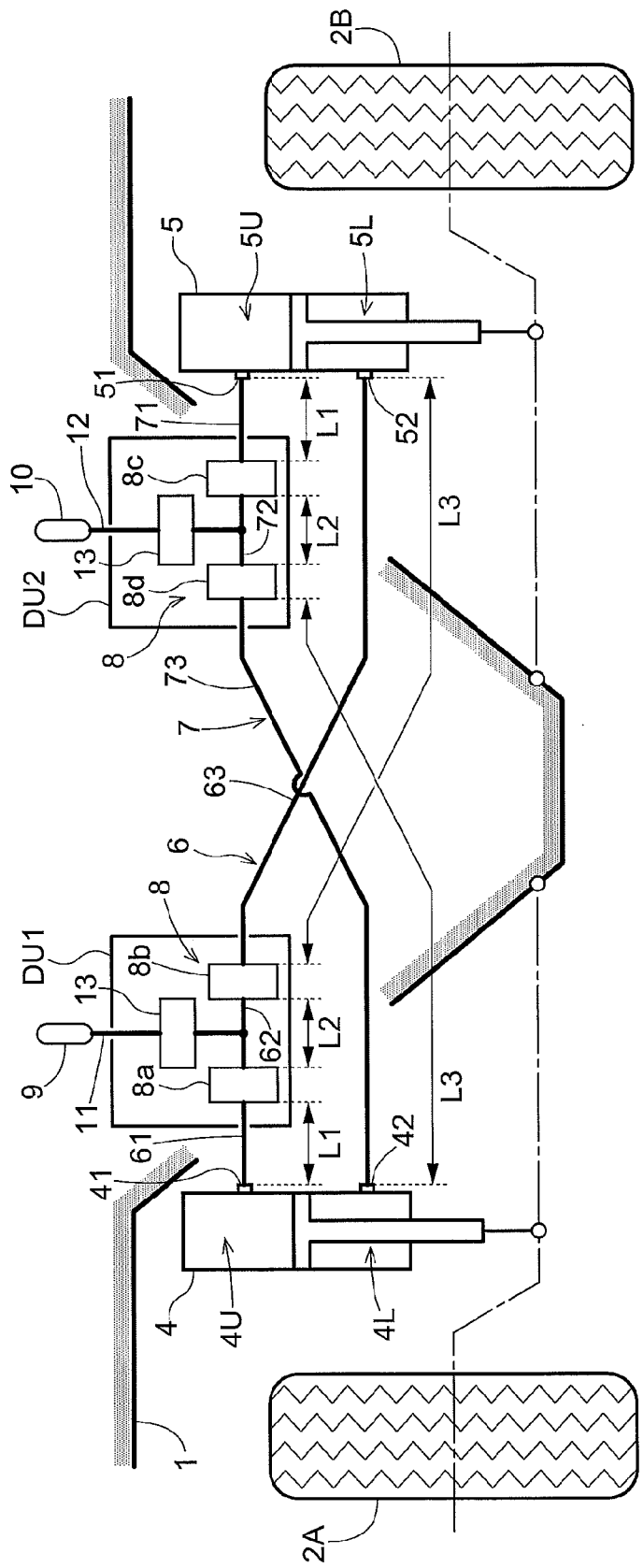
FIG. 12 is a schematic diagram showing a variation of the second basic configuration of the suspension device according to the invention.

FIG. 12 shows a variation of the second basic configuration of the suspension device according to the invention. This variation differs from the second basic configuration shown in FIG. 11 in that an accumulator-side hydraulic damping mechanism 13 is provided in a first accumulator fluid path 11 between the first accumulator 9 and the first connecting fluid path 62. Similarly, another accumulator-side hydraulic damping mechanism 13 is provided in a second accumulator fluid path 12 between the second accumulator 10 and the second connecting fluid path 72. The accumulator-side hydraulic damping mechanisms 13 have a structure that exerts a damping force basically with the use of an orifice or the like. A mechanism that is substantially the same as the first upper-side hydraulic damping mechanism 8a and the first lower-side hydraulic damping mechanism 8b can be used.

That is to say, in the variation of the second basic configuration in FIG. 12, the first hydraulic damping unit DU1 is a single unit into which the first upper-side hydraulic damping mechanism 8a, the first lower-side hydraulic damping mechanism 8b, the first connecting fluid path 62, the first accumulator fluid path 11, the accumulator-side hydraulic damping mechanism 13, and, if necessary, the first accumulator 9 are unitized. Similarly, the second hydraulic damping unit DU2 is a single unit into which the second upper-side hydraulic damping mechanism 8c, the second lower-side hydraulic damping mechanism 8d, the second connecting fluid path 72, the second accumulator fluid path 12, the accumulator-side hydraulic damping mechanism 13, and, if necessary, the second accumulator 10 are unitized.

Figure 13:
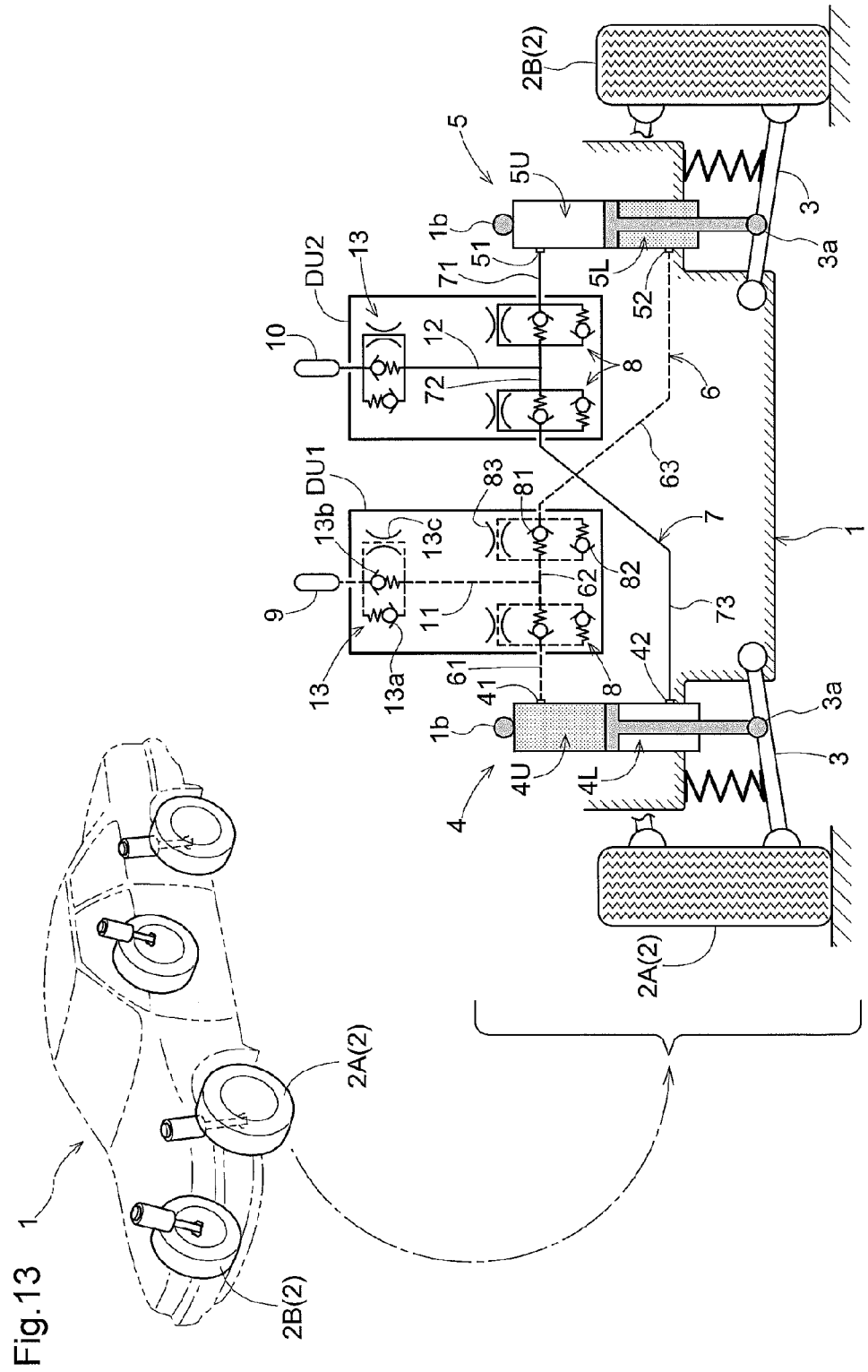
FIG. 13 is a front view schematically showing the second embodiment of the suspension device according to the invention.
Figure 14:
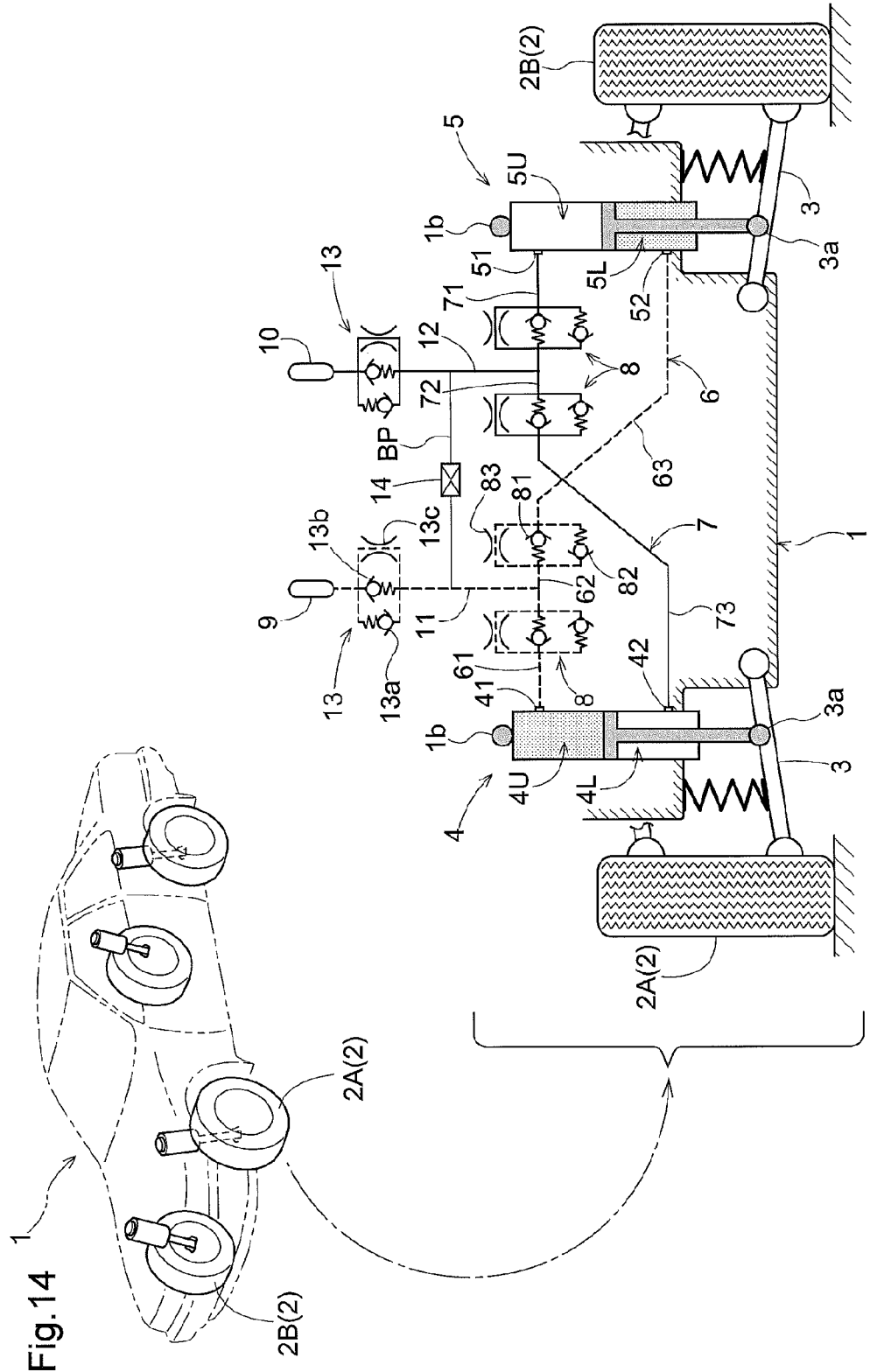
FIG. 14 is a front view schematically showing a variation of the second embodiment of the suspension device according to the invention shown in FIG. 13.

FIG. 13 shows the second embodiment, which is one of specific embodiments of the suspension device for a vehicle according to the invention, and FIG. 14 shows a variation thereof. A suspension device for a vehicle shown in FIG. 13 is based on the second basic configuration that has been described above using FIG. 11, and more specifically, FIG. 13 is a front view schematically showing a portion thereof including a pair of front wheels (or rear wheels). A suspension device shown in FIG. 14 differs from the suspension device shown in FIG. 13 in that the first fluid path 6 and the second fluid path 7 are connected together through the bridge fluid path BP.

The suspension device shown in FIG. 14 will be taken as an example in the following description.

In a vehicle to which this suspension device is mounted, the left wheel 2A and the right wheel 2B are attached to the vehicle body 1 in a manner that allows the wheels to rotate about their respective rotation axes. The left wheel 2A and the right wheel 2B will both be referred to as the wheels 2.

The wheels 2 are attached to the vehicle body 1 in a manner that allows the wheels 2 to move up and down by the left hydraulic cylinder 4 and the right hydraulic cylinder 5.

Specifically, the wheels 2 are attached to the vehicle body 1 by respective suspension links 3 that extend laterally from respective lower end portions of the vehicle body 1 and can swing up and down.

Also, upper end portions of the left and right hydraulic cylinders 4 and 5 are attached to respective support portions 1b of the vehicle body 1, and lower end portions thereof are attached to middle portions 3a of the respective suspension links 3. Thus, the left and right hydraulic cylinders 4 and 5 are configured to be expanded and contracted by relative vertical movements of the vehicle body 1 and the respective wheels 2 to achieve damping.

The suspension device includes the left and right hydraulic cylinders 4 and 5 that are attached between the left and right support portions 1b of the vehicle body 1 and the middle portions 3a of the left and right suspension links 3, the first fluid path 6 through which the upper chamber 4U of the left hydraulic cylinder 4 and the lower chamber 5L of the right hydraulic cylinder 5 are connected together in communication with each other, and the second fluid path 7 through which the upper chamber 5U of the right hydraulic cylinder 5 and the lower chamber 4L of the left hydraulic cylinder 4 are connected together in communication with each other. In the first and second fluid paths 6 and 7, the hydraulic damping mechanisms 8 that make a difference in the pressure or the flow speed of the hydraulic fluid and the first and second accumulators 9 and 10 are provided, where the hydraulic damping mechanisms 8 correspond to the first upper port 41, the first lower port 42, the second upper port 51, and the second lower port 52, which are the ports of the upper chamber 4U, the lower chamber 4L, the upper chamber 5U, and the lower chamber 5L, respectively.

Note that the first and second accumulators 9 and 10 are provided mainly in order to impart roll stiffness to the vehicle. The containers of the first and second accumulators 9 and 10 are filled with a gas. The volume of the gas varies depending on the volume of the hydraulic fluid. As a result, the accumulators 9 and 10 each act as a gas spring. Specifically, when the hydraulic fluid flows into the first or second accumulator 9, 10, the gas is compressed, and the gas spring's force (restoring force) is exerted on the hydraulic fluid, whereby roll stiffness (stabilizer function) can be imparted to the vehicle.

The first fluid path 6 and the first accumulator 9 are connected together in communication with each other through the first accumulator fluid path 11. On the other hand, the second fluid path 7 and the second accumulator 10 are connected together in communication with each other through the second accumulator fluid path 12. The accumulator-side hydraulic damping mechanisms 13 that exert a load when the hydraulic fluid enters the first and second accumulators 9 and 10 are provided in the first accumulator fluid path 11 and the second accumulator fluid path 12, respectively. Furthermore, a hydraulic balance mechanism 14 is provided between the first accumulator fluid path 11 and the second accumulator fluid path 12. The hydraulic balance mechanism 14 compensates for the vehicle's tilt etc. that is caused by a difference in the volume of the hydraulic fluid between the first and second accumulator fluid paths 11 and 12 due to an increase or decrease in the fluid volume in each accumulator fluid path, by allowing the movement of the hydraulic fluid through the bridge fluid path BP, thereby keeping a balance of the volume of the hydraulic fluid.

The hydraulic cylinders 4 and 5 are each divided into an upper and a lower chamber by a piston. Piston rods are provided, penetrating through the lower chambers 4L and 5L, respectively.

Each hydraulic damping mechanism 8 includes an uncontrolled check valve 81 that allows the hydraulic fluid to only enter the corresponding upper or lower chamber, a control check valve 82 that allows the hydraulic fluid to be only discharged from the corresponding upper or lower chamber, and adjusts the flow rate of the hydraulic fluid based on the pressure difference, where the control check valve 82 is opened when the pressure difference is larger than or equal to a predetermined pressure value, and an orifice 83 that imparts a resistance to the flow of the hydraulic fluid.

A relationship between pressure differences of the control check valve 82 and flow rates is shown in FIG. 6.

The uncontrolled check valve 81 and the control check valve 82 each include a spring that exerts a closing force on the disc. The uncontrolled check valve 81 and the control check valve 82 may be configured so that as the closing force of the spring increases, the flow resistance of the hydraulic fluid also increases, and conversely, as the closing force decreases, the flow resistance of the hydraulic fluid decreases. The uncontrolled check valve 81 and the control check valve 82 may have a leaf valve structure. Note that the uncontrolled check valve 81 does not have a high flow resistance, in order to allow the hydraulic fluid to easily flow in.

The degree of opening of the control check valve 82 varies depending on the flow rate and the pressure difference, and the control check valve 82 generates a damping force corresponding to the opening degree. To achieve this, for example, the control check valve 82 is configured so that a flat spring etc. is used to exert an elastic force in a direction in which the flow path is closed.

Also, the control check valve 82 and the orifice 83 are configured to provide a relationship between piston speeds and flow resistances (corresponding to damping forces) that is shown in FIG. 5. As shown in FIG. 5, when the piston speed is low, increases in the flow resistance caused by the orifice 83 are dominating. When the piston speed is high, changes in the flow resistance caused by the control check valve 82 are dominating.

As can be seen from FIG. 5, desired damping suitable for the piston speed can be obtained.

As shown in FIG. 14, each accumulator-side hydraulic damping mechanism 13 includes a control check valve 13a that allows the hydraulic fluid to only enter the first or second accumulator 9, 10, and adjusts the flow rate based on the value of the pressure, where the control check valve 13a is opened when the pressure is higher than or equal to a predetermined pressure value, an uncontrolled check valve 13b that allows the hydraulic fluid to only be discharged from the first or second accumulator 9, 10, and an orifice 13c. The control check valve 13a and the uncontrolled check valve 13b each include a spring that exerts a closing force on the disc. The control check valve 13a and the uncontrolled check valve 13b may be configured so that as the closing force of the spring increases, the flow resistance of the hydraulic fluid also increases, and conversely, as the closing force decreases, the flow resistance of the hydraulic fluid decreases. The control check valve 13a and the uncontrolled check valve 13b may have a leaf valve structure. The uncontrolled check valve 13b has a low flow resistance so that the hydraulic fluid smoothly flows out of the first or second accumulator 9, 10, and the control check valve 13a is configured to generate a suitable damping force.

Also, as with the orifice 83, the orifice 13c can adjust the damping force when the piston speed is within a low region. Note that the orifice 13c is not necessarily needed, and may be removed, depending on the performance that the suspension device is required to have.

Next, operations of the suspension device with respect to motions of the wheels 2 will be described.

Figure 15:
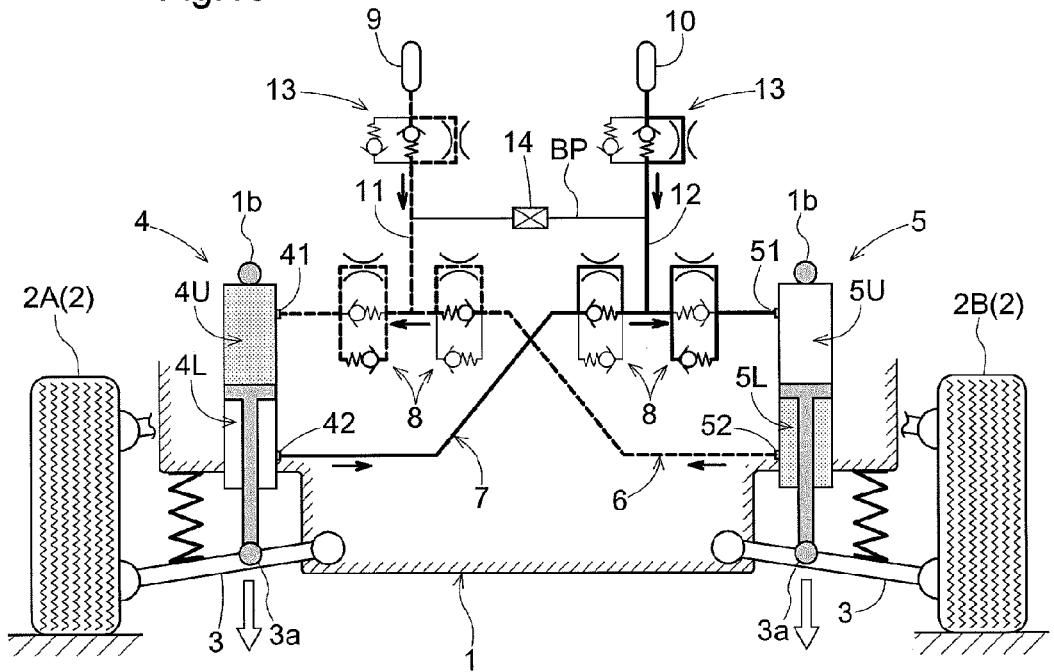
FIG. 15 is a schematic diagram showing an effect of the suspension device.
Figure 16:
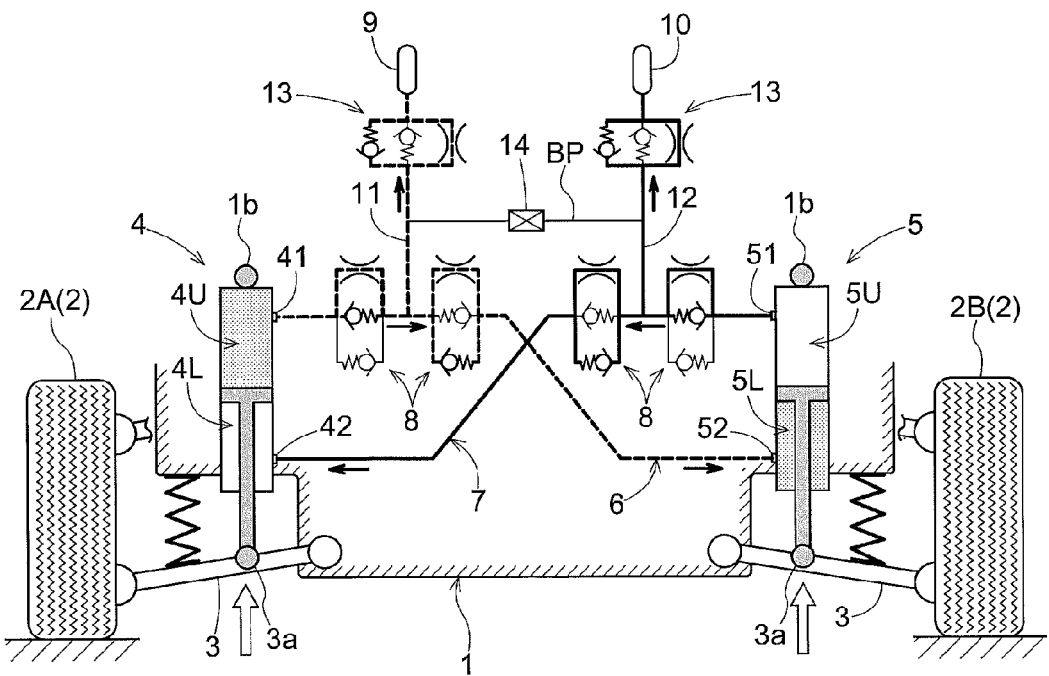
FIG. 16 is a schematic diagram showing an effect of the suspension device.
Figure 17:
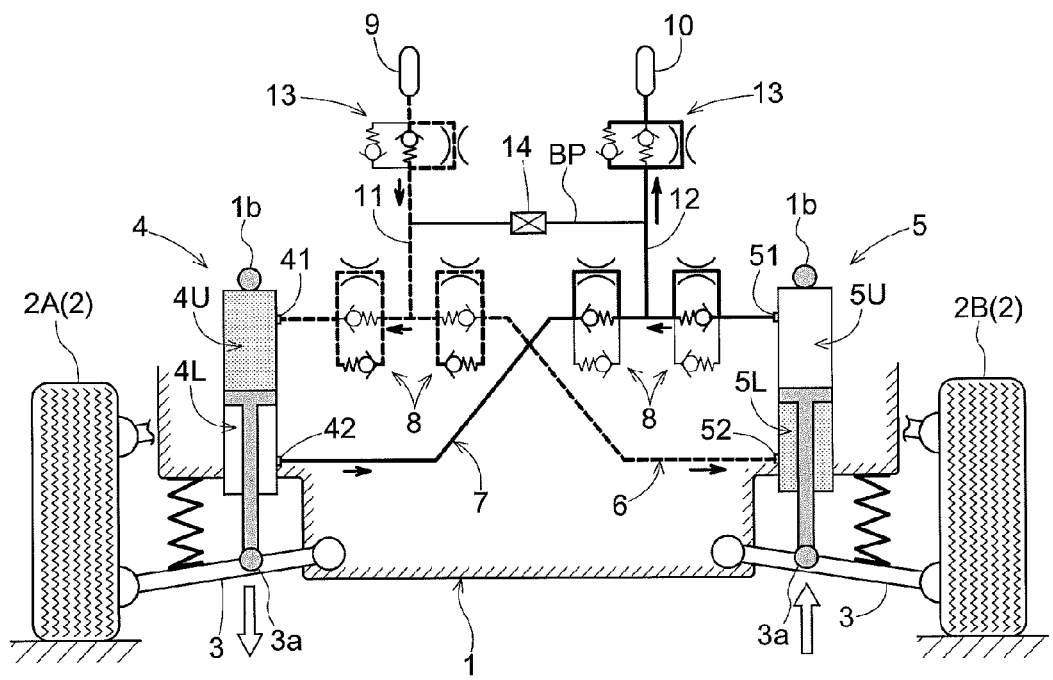
FIG. 17 is a schematic diagram showing an effect of the suspension device.

The following motions of the wheels 2 will be described: "expansion bounce", which is when the left and right hydraulic cylinders 4 and 5 expand together as shown in FIG. 15; "contraction bounce", which is when the left and right hydraulic cylinders 4 and 5 contract together as shown in FIG. 16; and "roll", which is when that one of the left and right hydraulic cylinders 4 and 5 expands while the other one contracts as shown in FIG. 17.

The "expansion bounce" occurs when both of the wheels 2 rebound. As shown in FIG. 15, during the "expansion bounce," the hydraulic fluid is discharged from both of the lower chambers 4L and 5L, and flows through the corresponding hydraulic damping mechanisms 8 into the upper chambers 5U and 4U of the respective opposite cylinders. At this time, the absolute value of the amount of expansion or contraction is the same between the lower chamber 4L (5L) on one side and the upper chamber 5U (4U) on the other side, and therefore, the hydraulic fluid having an amount corresponding to the volume of the piston rod that is discharged from the lower chamber 4L (5L) smoothly flows from the accumulator 10 (9) through the uncontrolled check valve 13b to the upper chamber 5U (4U). During the above flow of the hydraulic fluid, the hydraulic fluid is mainly discharged through the hydraulic damping mechanisms 8 corresponding to the lower chambers 4L and 5L, to generate damping forces.

Also, at this time, in the first and second upper-side and lower-side hydraulic damping mechanisms 8 corresponding to the upper chambers 4U and 5U, the uncontrolled check valve 81 is set to have characteristics that allow the hydraulic fluid to smoothly flow into the upper chambers 4U and 5U in order to ensure a sufficient hydraulic pressure in the corresponding upper and lower chambers.

The "contraction bounce" occurs when both of the wheels 2 bound. As shown in FIG. 16, during the "contraction bounce," the hydraulic fluid is discharged from both of the upper chambers 4U and 5U, and flows through the corresponding hydraulic damping mechanisms 8 into the lower chambers 5L and 4L of the respective opposite cylinders. At this time, the absolute value of the amount of expansion or contraction is the same between the upper chamber 4U (5U) on one side and the lower chamber 5L (4L) on the other side, and therefore, the hydraulic fluid having an amount corresponding to the volume of the piston rod that enters the upper chamber 4U (5U) flows through the accumulator-side hydraulic damping mechanism 13 into the accumulator 9 (10). During the above flow of the hydraulic fluid, the hydraulic fluid is discharged through the first and second upper-side and lower-side hydraulic damping mechanisms 8 corresponding to the upper chambers 4U and 5U, to generate damping forces.

Note that, at this time, the flow rate of the hydraulic fluid having an amount corresponding to the volume of the rod that passes through the accumulator-side hydraulic damping mechanism 13 is low, and the damping force generated by the accumulator-side hydraulic damping mechanism 13 is small. Also, in the hydraulic damping mechanisms 8 corresponding to the lower chambers 4L and 5L, the uncontrolled check valve 81 is set to have characteristics that allow the hydraulic fluid to smoothly enter the lower chambers 4L and 5L in order to ensure a sufficient hydraulic pressure in the corresponding upper and lower chambers.

The "roll" occurs when the vehicle turns or corners right or left. Here, a case where the vehicle turns or corners left will be described.

The left wheel 2A (an inner wheel during turning or cornering) relatively moves in the rebound direction, and as shown in FIG. 17, the hydraulic fluid is discharged from the lower chamber 4L, and flows through the corresponding hydraulic damping mechanism 8 and accumulator-side hydraulic damping mechanism 13 into the accumulator 10. The right wheel 2B (an outer wheel during turning or cornering) relatively moves in the bound direction, and as shown in FIG. 17, the hydraulic fluid is discharged from the upper chamber 5U, and flows through the corresponding hydraulic damping mechanism 8 and accumulator-side hydraulic damping mechanism 13 into the accumulator 10. At this time, a significant damping effect can be achieved by the hydraulic damping mechanism 8 corresponding to the lower chamber 4L of the left hydraulic cylinder 4, the hydraulic damping mechanism 8 corresponding to the upper chamber 5U of the right hydraulic cylinder 5, and the accumulator-side hydraulic damping mechanism 13 corresponding to the accumulator 10.

Also, the hydraulic fluid is supplied from the accumulator 9 to the upper chamber 4U of the left hydraulic cylinder 4 and the lower chamber 5L of the right hydraulic cylinder 5. In the hydraulic damping mechanisms 8 corresponding to the upper and lower chambers 4U and 5L, the uncontrolled check valves for the upper and lower chambers 4U and 5L are set so that the hydraulic fluid smoothly enter the upper and lower chambers 4U and 5L in order to ensure sufficient fluid pressures of the corresponding upper and lower chambers 4U and 5L.

The characteristics of a shock damping force with respect to the above-described "expansion bounce," "contraction bounce," and "roll" may be shown in FIG. 5. Dashed lines indicate "expansion bounce" and "contraction bounce," and solid lines indicate "roll."

The horizontal axis represents piston speeds, and the vertical axis represents damping forces. As the piston speed changes, the lines bend. In an initial area where the lines have a steep slope, the damping effect of the orifice 83 of the hydraulic damping mechanism 8 is mainly provided. In an area where the lines have a gentle slope, the damping effect of each of the hydraulic damping mechanisms 8 and the accumulator-side hydraulic damping mechanisms 13 is provided.

In the suspension device of this embodiment, the shock with respect to "expansion bounce", "contraction bounce", and "roll" can be satisfactorily damped by the effect of the hydraulic damping mechanisms 8 and the accumulator-side hydraulic damping mechanisms 13 depending on the vertical motion of the wheels 2, to simultaneously ensure sufficient driving stability and good ride quality, without using a complicated mechanical mechanism or control mechanism.

Also, the suspension device of this embodiment can have both the absorber function and the stabilizer function, and therefore, a stabilizer bar can be removed, resulting in a simpler structure around the wheels 2.

Note that in the first hydraulic damping unit DU1, the fluid paths are formed so that when the roll occurs, the flows of the hydraulic fluid are changed in the following manner: the flow velocity of the hydraulic fluid flowing from the first upper port 41 into the first hydraulic damping unit DU1 is decreased by the first upper-side hydraulic damping mechanism 8a, while the flow velocity of the hydraulic fluid flowing from the second lower port 52 into the first hydraulic damping unit DU1 is decreased by the first lower-side hydraulic damping mechanism 8b. Then, if the length of the first connecting fluid path 62 is sufficiently reduced so that the hydraulic fluid from the first upper port 41 whose flow velocity has been decreased by the first upper-side hydraulic damping mechanism 8a and the hydraulic fluid from the second lower port 52 whose flow velocity has been decreased by the first lower-side hydraulic damping mechanism 8b collide (join) with each other while the flow velocities remain decreased, the pressure loss due to the collision can be reduced. For this reason, the length of the first connecting fluid path 62 is set as short as possible. Also, in the case where pressure fluctuations occur in the resultant joined flow of the hydraulic fluid, the pressure fluctuations are absorbed by the joined flow of the hydraulic fluid flowing through the first accumulator fluid path 11 into the first accumulator 9. Therefore, the first accumulator fluid path 11 and the first connecting fluid path 62 are also formed so that the flow of the hydraulic fluid into which the two flows have joined together in the first connecting fluid path 62 can smoothly flow into the first accumulator fluid path 11. That is to say, it is advantageous to determine the geometry of the interior of the first connecting fluid path 62 so that the flow of the hydraulic fluid into which the flows of the hydraulic fluid having opposite directional vectors have been joined together in the first connecting fluid path 62 has sufficient directional vector components in a direction in which the hydraulic fluid smoothly flows into the first accumulator fluid path 11.

It goes without saying that this fluid path configuration of the first hydraulic damping unit DU1 is also applied to the second hydraulic damping unit DU2.

The hydraulic damping mechanisms 8 and the accumulator-side hydraulic damping mechanisms 13 are not limited to the specific configurations as described in the above embodiment. A configuration that electrically controls the valve opening state may also be incorporated in these mechanisms.

INDUSTRIAL APPLICABILITY

The present invention is applicable to suspension devices for vehicles that are attached to front and rear wheels of the vehicles.

REFERENCE SIGNS LIST

1 Vehicle body
2A Left wheel
2B Right wheel
4 Left hydraulic cylinder (first hydraulic cylinder)
4U Upper chamber
4L Lower chamber
41 Upper port (first upper port)
42 Lower port (first lower port)
5 Right hydraulic cylinder (second hydraulic cylinder)

5U Upper chamber
5L Lower chamber
51 Upper port (second upper port)
52 Lower port (second lower port)
6 First fluid path
61 Upper-side fluid path (first upper-side fluid path)
62 Connecting fluid path (first connecting fluid path)
63 Lower-side fluid path (first lower-side fluid path)
11 First accumulator fluid path (first branch fluid path)
7 Second fluid path
71 Upper-side fluid path (second upper-side fluid path)
72 Connecting fluid path (second connecting fluid path)
73 Lower-side fluid path (second lower-side fluid path)
12 Second accumulator fluid path (second branch fluid path)
8 Hydraulic damping mechanism
8a First upper-side hydraulic damping mechanism
8b First lower-side hydraulic damping mechanism
8c Second upper-side hydraulic damping mechanism
8d Second lower-side hydraulic damping mechanism
81 Uncontrolled check valve
82 Control check valve
83 Orifice
9 First accumulator
10 Second accumulator
13 Accumulator-side hydraulic damping mechanism (first and second auxiliary hydraulic damping mechanisms)
14 Hydraulic balance mechanism
15 Flow control mechanism
16 Third accumulator
DU1 First hydraulic damping unit
DU2 Second hydraulic damping unit
DU3 Hydraulic balance unit
BP Bridge fluid path

The invention claimed is:

1. A suspension device for a vehicle comprising:
a first hydraulic cylinder configured to be interposed between one of left and right wheels and a vehicle body and having an upper chamber and a lower chamber;
a second hydraulic cylinder configured to be interposed between the other one of the left and right wheels and the vehicle body and having an upper chamber and a lower chamber;
a first fluid path through which a first upper port that opens into the upper chamber of the first hydraulic cylinder and a second lower port that opens into the lower chamber of the second hydraulic cylinder are connected together in communication with each other;
a second fluid path through which a second upper port that opens into the upper chamber of the second hydraulic cylinder and a first lower port that opens into the lower chamber of the first hydraulic cylinder are connected together in communication with each other;
a first hydraulic damping mechanism provided in the first fluid path;
a second hydraulic damping mechanism provided in the second fluid path;
a first accumulator connected to the first fluid path via a first branch fluid path having a first auxiliary hydraulic damping mechanism;
a second accumulator connected to the second fluid path via a second branch fluid path having a second auxiliary hydraulic damping mechanism; and
a bridge fluid path connected to a portion of the first branch fluid path between the first accumulator and the first auxiliary hydraulic damping mechanism at one end and connected to a portion of the second branch fluid path between the second accumulator and the second auxiliary hydraulic damping mechanism at the other end.

2. The suspension device for a vehicle according to claim 1, wherein each of the first auxiliary hydraulic damping mechanism and the second auxiliary hydraulic damping mechanism includes an orifice.

3. The suspension device for a vehicle according to claim 1, further comprising:
a third accumulator connected to the bridge fluid path via a flow control mechanism.

4. The suspension device for a vehicle according to claim 3, wherein the flow control mechanism includes a housing forming internal chambers that are in communication with the third accumulator, a first differential pressure operated check valve disposed between the bridge fluid path on the first branch fluid path side and the corresponding internal chamber, and a second differential pressure operated check valve connected to the bridge fluid path on the second branch fluid path side and the corresponding internal chamber.

5. The suspension device for a vehicle according to claim 3, wherein the flow control mechanism is orifices that are provided on both sides of a portion where the third accumulator is connected to the bridge fluid path.

6. The suspension device for a vehicle according to claim 1, wherein the first auxiliary hydraulic damping mechanism is provided in a portion of the first branch fluid path that is closer to the first fluid path than is the portion to which the bridge fluid path is connected, and the second auxiliary hydraulic damping mechanism is provided in a portion of the second branch fluid path that is closer to the second fluid path than is the portion to which the bridge fluid path is connected.

7. The suspension device for a vehicle according to claim 1, wherein the first hydraulic damping mechanism has a first upper-side hydraulic damping mechanism provided on the first upper port side in the first fluid path and a first lower-side hydraulic damping mechanism provided on the second lower port side in the first fluid path, and the second hydraulic damping mechanism has a second upper-side hydraulic damping mechanism provided on the second upper port side in the second fluid path and a second lower-side hydraulic damping mechanism provided on the first lower port side in the second fluid path, and
the first branch fluid path is connected between the first upper-side hydraulic damping mechanism and the first lower-side hydraulic damping mechanism, and the second branch fluid path is connected between the second upper-side hydraulic damping mechanism and the second lower-side hydraulic damping mechanism.

8. The suspension device for a vehicle according to claim 7, wherein the first fluid path includes a first upper-side fluid path through which the first upper port and the first upper-side hydraulic damping mechanism are connected together, a first connecting fluid path through which the first upper-side hydraulic damping mechanism and the first lower-side hydraulic damping mechanism are connected together, and a first lower-side fluid path through which the first lower-side hydraulic damping mechanism and the first lower port are connected together, the fluid path lengths of the first upper-side fluid path and the first connecting fluid path being shorter than the fluid path length of the first lower-side fluid path, and
the second fluid path includes a second upper-side fluid path through which the second upper port and the second upper-side hydraulic damping mechanism are connected together, a second connecting fluid path through which the second upper-side hydraulic damping mechanism and the second lower-side hydraulic damping mechanism are connected together, and a second lower-side fluid path through which the second lower-side hydraulic damping mechanism and the second lower port are connected together, the fluid path lengths of the second upper-side fluid path and the second connecting fluid path being shorter than the fluid path length of the second lower-side fluid path.

9. The suspension device for a vehicle according to claim 8, wherein the sum of the fluid path lengths of the first upper-side fluid path and the first connecting fluid path is shorter than the fluid path length of the first lower-side fluid path, and the sum of the fluid path lengths of the second upper-side fluid path and the second connecting fluid path is shorter than the fluid path length of the second lower-side fluid path.

10. The suspension device for a vehicle according to claim 8, wherein the first accumulator is connected to the first connecting fluid path, and the second accumulator is connected to the second connecting fluid path.

11. The suspension device for a vehicle according to claim 8,
wherein the first upper-side hydraulic damping mechanism, the first lower-side hydraulic damping mechanism, and the first connecting fluid path are integrated into a first hydraulic damping unit, the first hydraulic damping unit being disposed in proximity to the first upper port with respect to the fluid path length of the first fluid path, and
the second upper-side hydraulic damping mechanism, the second lower-side hydraulic damping mechanism, and the second connecting fluid path are integrated into a second hydraulic damping unit, the second hydraulic damping unit being disposed in proximity to the second upper port with respect to the fluid path length of the second fluid path.

12. The suspension device for a vehicle according to claim 11, wherein the first hydraulic damping unit further incorporates an accumulator-side hydraulic damping mechanism provided in a first accumulator fluid path between the first accumulator and the first connecting fluid path, and the second hydraulic damping unit further incorporates another accumulator-side hydraulic damping mechanism provided in a second accumulator fluid path between the second accumulator and the second connecting fluid path.

13. The suspension device for a vehicle according to claim 12, wherein the first hydraulic damping unit further incorporates the first accumulator, and the second hydraulic damping unit further incorporates the second accumulator.

14. The suspension device for a vehicle according to claim 12, wherein each of the accumulator-side hydraulic damping mechanisms includes an orifice.

15. The suspension device for a vehicle according to claim 7, wherein the first upper-side hydraulic damping mechanism, the first lower-side hydraulic damping mechanism, the second upper-side hydraulic damping mechanism, and the second lower-side hydraulic damping mechanism each includes an orifice, a pressure control check valve, and an uncontrolled check valve that are connected in parallel each other.

* * * * *